(12) United States Patent
Saigusa

(10) Patent No.: US 9,971,554 B2
(45) Date of Patent: May 15, 2018

(54) RESOLVING PRINT SETTING CONFLICTS IN AN IMAGE FORMING SYSTEM

(71) Applicant: CANON KABUSHIKI KAISHA, Tokyo (JP)

(72) Inventor: Hirokazu Saigusa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/207,977

(22) Filed: Jul. 12, 2016

(65) Prior Publication Data
US 2017/0017447 A1    Jan. 19, 2017

(30) Foreign Application Priority Data
Jul. 13, 2015  (JP) .................. 2015-140046

(51) Int. Cl.
*G06F 3/12* (2006.01)
*H04N 1/00* (2006.01)

(52) U.S. Cl.
CPC .......... *G06F 3/1255* (2013.01); *G06F 3/1205* (2013.01); *G06F 3/1285* (2013.01); *H04N 1/00915* (2013.01); *H04N 2201/0094* (2013.01)

(58) Field of Classification Search
CPC .................................... G06F 3/1255
See application file for complete search history.

(56) References Cited

U.S. PATENT DOCUMENTS

2012/0224207 A1* 9/2012 Sueshige ............... G06F 3/1205
358/1.13

FOREIGN PATENT DOCUMENTS

JP   2003-099170 A   4/2003

* cited by examiner

*Primary Examiner* — Eric A Rust
(74) *Attorney, Agent, or Firm* — Canon U.S.A., Inc. IP Division

(57) ABSTRACT

An information processing apparatus according to the present invention, starts initialization of a first module which performs conflict resolving processing for resolving a combination of invalid print settings, performs the conflict resolving processing by the first module if a print setting is changed on an application and initialization of the first module is completed, and calls the conflict resolving processing by a second module if an instruction to terminate the application is received and initialization of the first module is not completed.

15 Claims, 25 Drawing Sheets

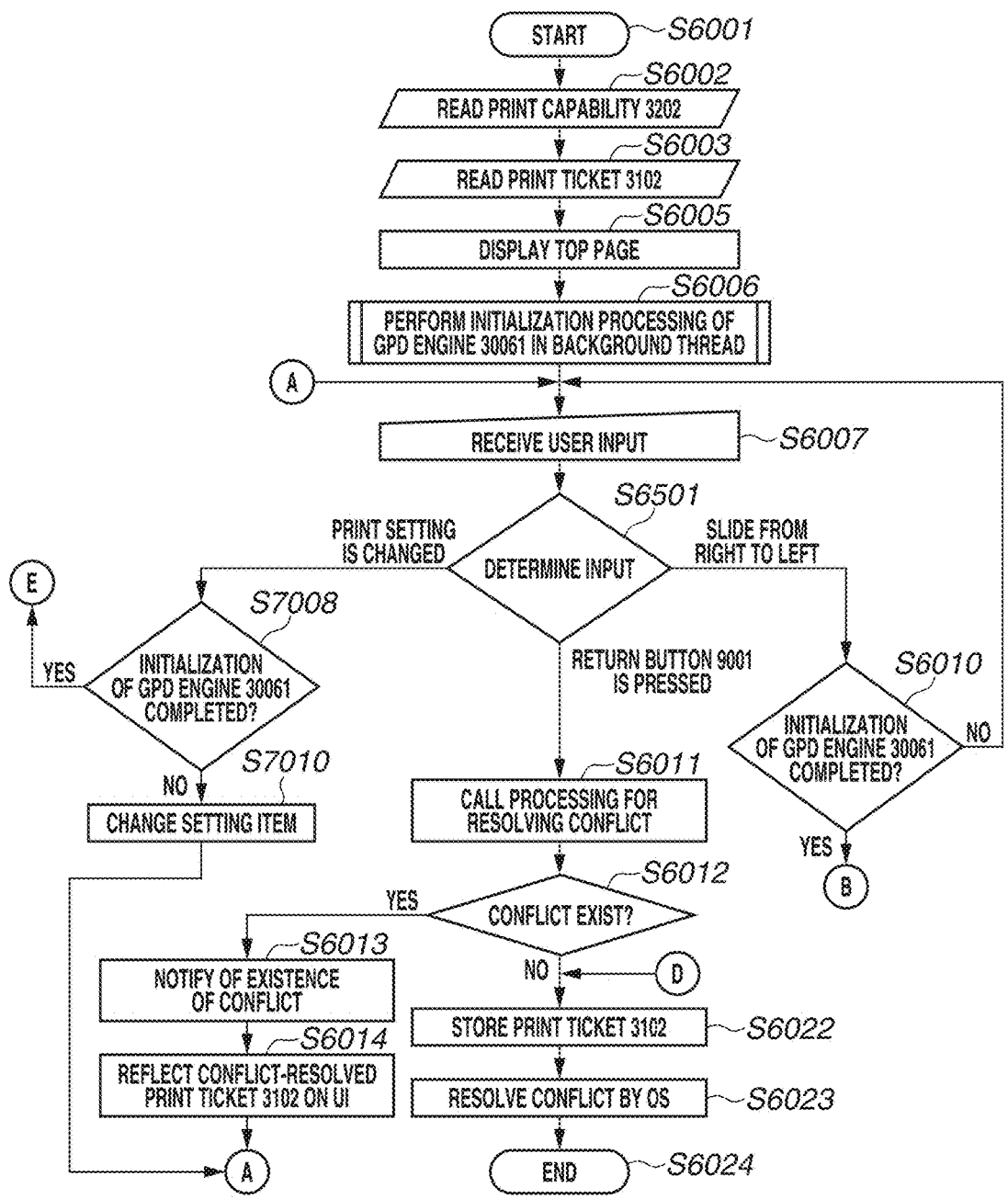

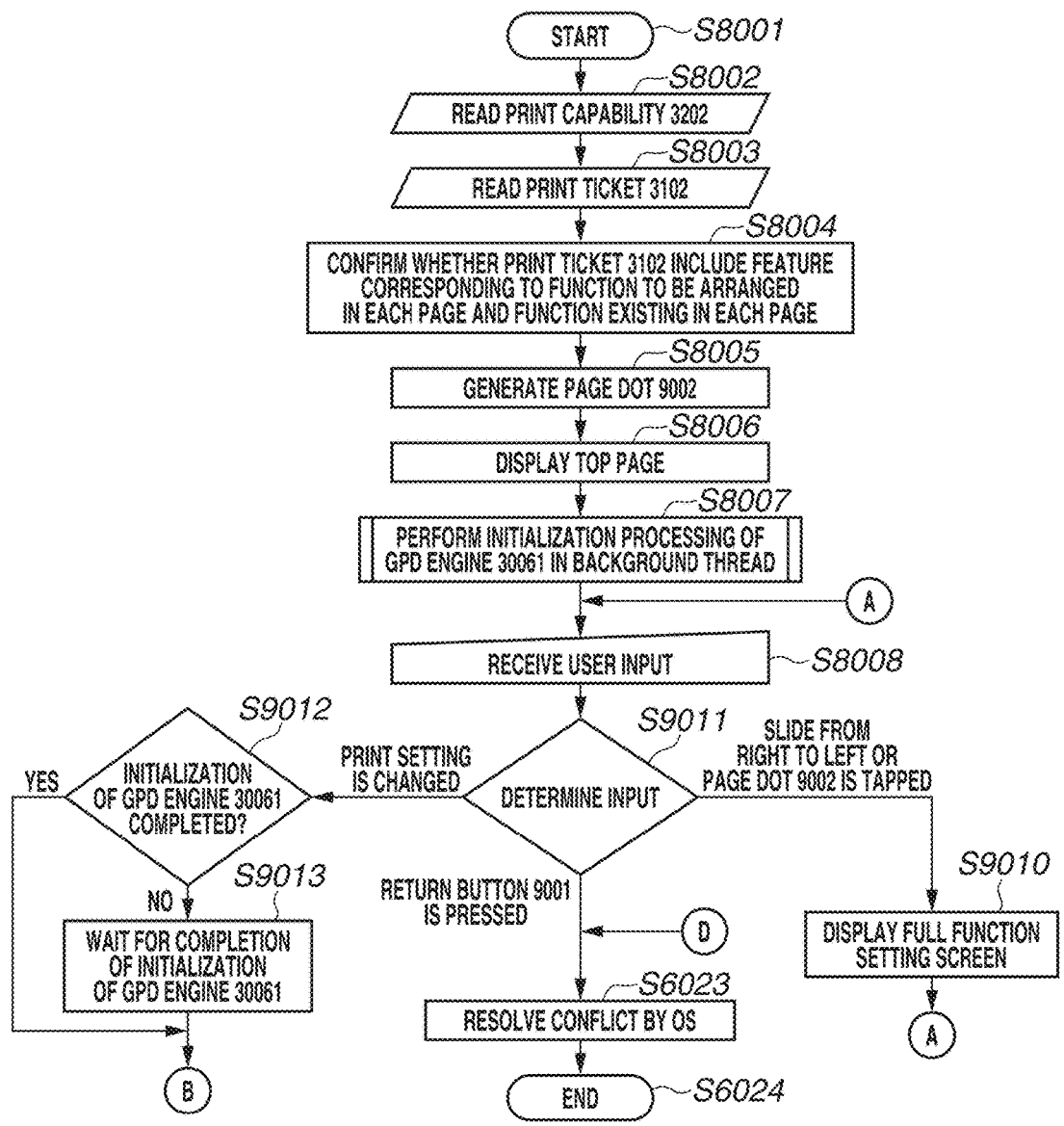

```
<psf:Feature name="psk:PageMediaSize">
    <psf:Property name="psf:SelectionType">
        <psf:Value xsi:type="xsd:QName">psk:PickOne</psf:Value>
    </psf:Property>
    <psf:Property name="psk:DisplayName">
        <psf:Value xsi:type="xsd:string">Letter</psf:Value>
    </psf:Property>
    <psf:Option name="psk:NorthAmericaLetter" constrained="psk:None">
        <psf:ScoredProperty name="psk:MediaSizeWidth">
            <psf:Value xsi:type="xsd:integer">279400</psf:Value>
        </psf:ScoredProperty>
        <psf:ScoredProperty name="psk:MediaSizeHeight">
            <psf:Value xsi:type="xsd:integer">431800</psf:Value>
        </psf:ScoredProperty>
        <psf:Property name="psk:DisplayName">
            <psf:Value xsi:type="xsd:string">Letter</psf:Value>
        </psf:Property>
    </psf:Option>
<psf:Feature/>
```

```
<psf:Feature name="psk:DocumentDuplex">
    <psf:Option name="psk:OneSided" />
</psf:Feature>
```

InvalidCombination: LIST(PaperSize.JAPANESE_POSTCARD, DUPLEX.VERTICAL)

```
*Feature: PaperSize    1704
{
    *rcNameID: =IDS_PAGEMEDIASIZE
    *ConflictPriority: 1
    *Option: JAPANESE_POSTCARD
    {
        *rcNameID: =RCID_DMPAPER_SYSTEM_NAME
        *PrintableArea: PAIR(4244, 6532)
        *PrintableOrigin: PAIR(240, 240)
        *InsertBlock: =PostcardConstraints
    }
}
```
*1703*

```
*Feature: Duplex
{
    *rcNameID: =IDS_DOCUMENTDUPLEX
    *PrintSchemaKeywordMap: "DocumentDuplex"
    *ConflictPriority: 15    1705
    *Option: NONE
    {
        *rcNameID: =IDS_DOCUMENTDUPLEX_ONESIDED
    }
    *Option: VERTICAL
    {
        *rcNameID: =IDS_DOCUMENTDUPLEX_TWOSIDEDLONGEDGE }
    *Option: HORIZONTAL
    {
        *rcNameID: =IDS_DOCUMENTDUPLEX_TWOSIDEDSHORTEDGE
    }
}
```

RESOLVING PRINT SETTING CONFLICTS IN AN IMAGE FORMING SYSTEM

BACKGROUND OF THE INVENTION

Field of the Invention

The present invention relates to a technique for resolving a conflict in a print setting.

Description of the Related Art

When a user changes a print setting, the changed print setting sometimes includes a combination (conflict) in which two print settings are invalid.

Japanese Patent Application Laid-Open No. 2003-099170 discusses a technique for reading a conflict processing rule and performing control by assuming such a conflict.

SUMMARY OF THE INVENTION

When a conflict occurs, processing for resolving the conflict can be performed by, for example, forcibly changing a print setting so as not to use a function having the lowest priority in addition to the control described in Japanese Patent Application Laid-Open No. 2003-099170.

In the present specification, a case is discussed in which two modules can be used for conflict resolving processing. A first module takes time to be initialized but can perform the conflict resolving processing at high speed after the initialization. A second module does not require, for example, initialization of an application for performing a print setting but performs the conflict resolving processing itself at low speed.

If only the first module is used in these two modules, a user needs to wait until the first module is initialized. On the other hand, if only the second module is used, a user needs to wait for completion of the conflict resolving processing by the second module for a longer time than that of the conflict resolving processing by the first module every time the print setting is changed.

In this regard, the present invention is directed to shortening of a wait time of a user which is caused by two modules of the first module and the second module.

An information processing apparatus according to the present invention includes an initialization unit configured to perform initialization of a first module which performs conflict resolving processing for resolving a combination in which a print setting is invalid, wherein the print setting is received on an application, and a control unit configured to, if the application receives a change in the print setting and initialization of the first module is completed, perform the conflict resolving processing by the first module and, if an instruction to terminate the application is received and initialization of the first module is not completed, call conflict resolving processing by a second module.

Further features of the present invention will become apparent from the following description of exemplary embodiments with reference to the attached drawings.

BRIEF DESCRIPTION OF THE DRAWINGS

FIGS. 7A and 7B are flowcharts of a touch panel print advanced setting application according to a second exemplary embodiment.

FIGS. 9A and 9B are flowcharts of a touch panel print advanced setting application according to a fourth exemplary embodiment.

FIGS. 12A and 12B are examples of a print capability and a print ticket.

FIGS. 13A to 13C are examples of application generic printer description (GPD) files.

DESCRIPTION OF THE EMBODIMENTS

Figure 1:
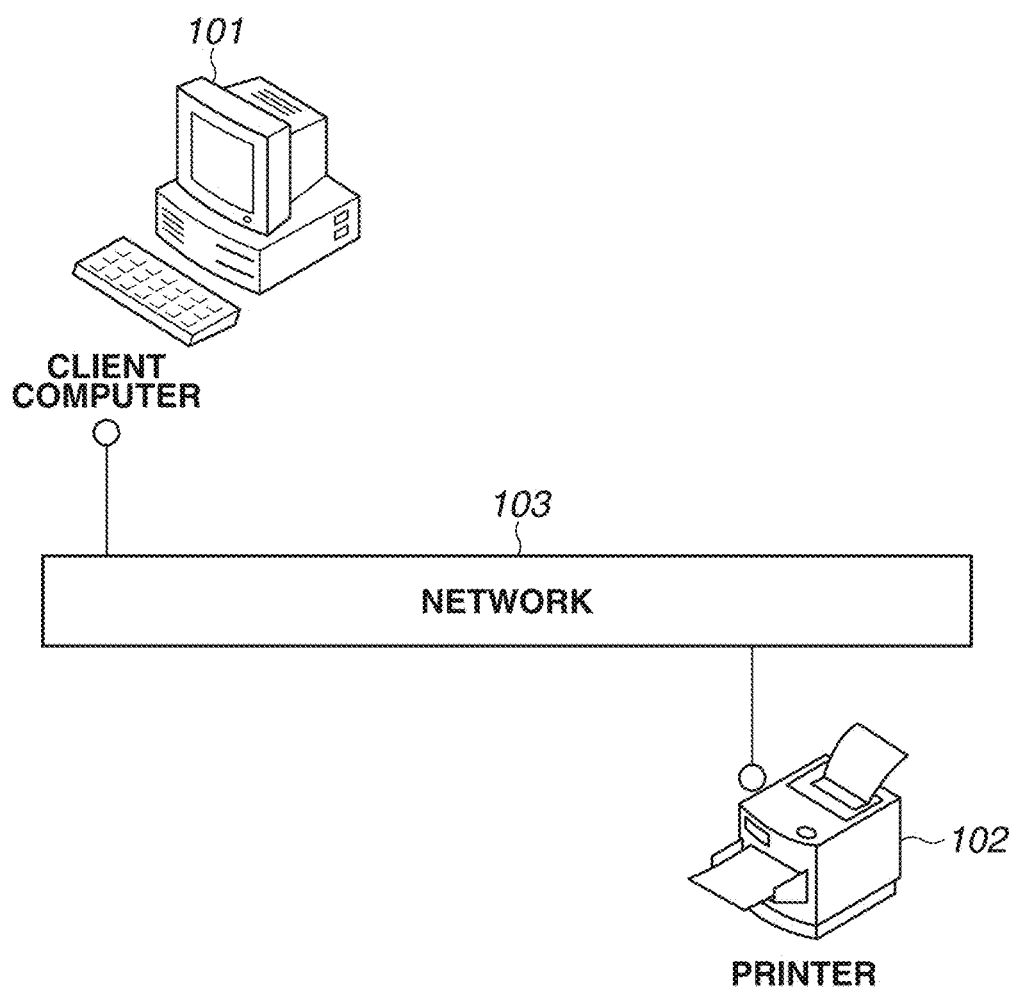
FIG. 1 is a schematic diagram illustrating a system configuration.

FIG. 1 is a schematic diagram illustrating a system configuration of a first exemplary embodiment according to the present invention. The system includes a client computer 101 as an example of an information processing apparatus and a printer 102 capable of receiving and printing print data in a page description language (PDL) format. These apparatuses are connected and can communicate with each other via a network 103 as typified by a local area network (LAN), and the network 103 is connected and can communicate with an external network. The printer 102 may be a single function printer including only a print function or a multifunction printer including a print function, a scanning function, and a copying function.

Figure 2:
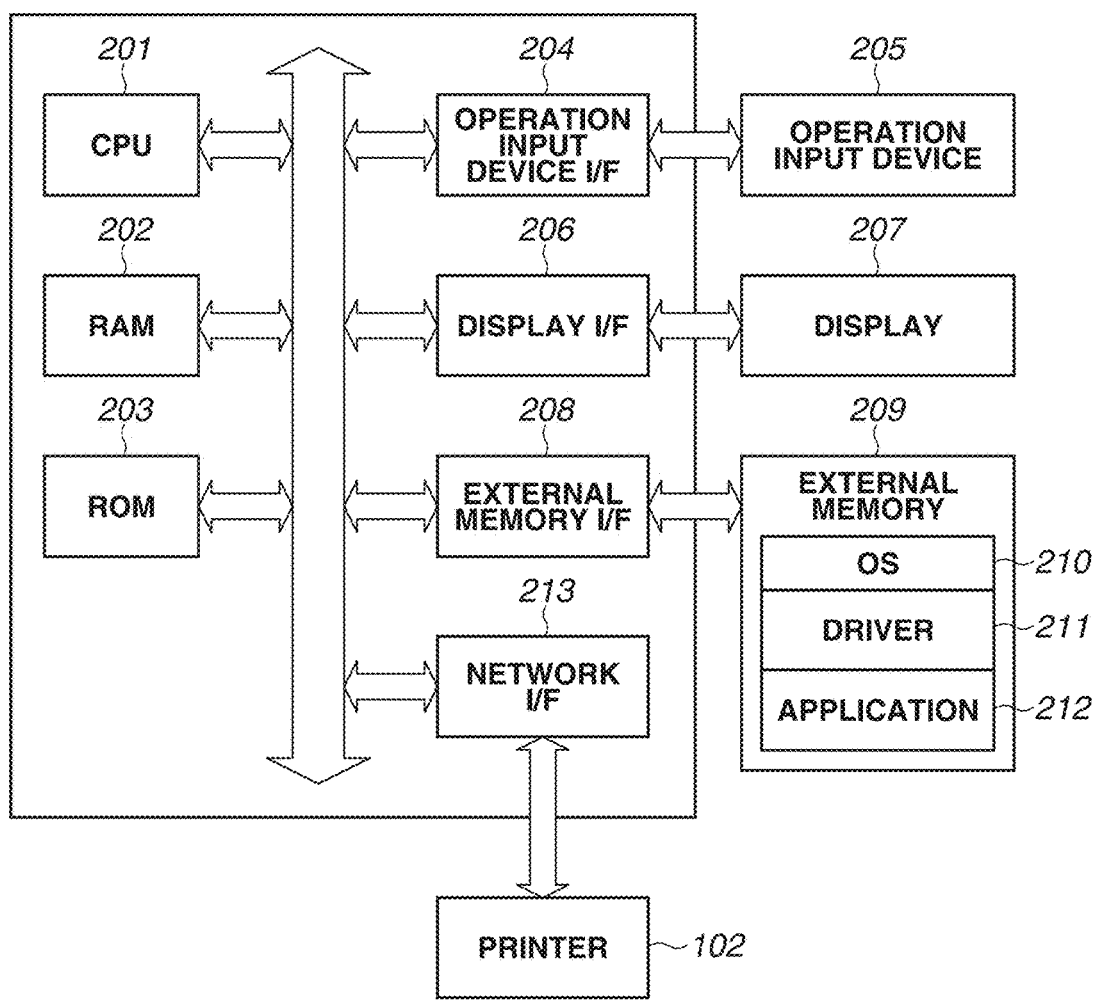
FIG. 2 illustrates a hardware configuration of a client computer.

FIG. 2 is a block diagram illustrating a hardware configuration of the client computer 101 in FIG. 1. In the client computer 101, a central processing unit (CPU) controls each device connected to a system bus according to a program stored in a random access memory (a RAM 202). The client computer 101 includes at least one CPU 201. In addition, the CPU 201 executes processing based on a program stored in an external memory 209, and thus a software configuration of the client computer 101 illustrated in FIG. 3 and processing in each step in flowcharts described below can be realized. The RAM 202 functions as a main memory and a work area of the CPU 201 and the like. In a read-only memory (ROM) 203, various programs such as a boot program and a basic input output system (BIOS) are written. An operation input device interface (I/F) 204 is an interface for controlling an operation input device 205 such as a keyboard and a pointing device (mouse) touch user interface (UI). A display I/F 206 controls screen display on a display 207. An external memory I/F 208 controls, for example, an access between the external memory 209 such as a hard disk (HD) and a solid state disk (SSD). The external memory 209 stores an operating system program (OS) 210, various applications 212 corresponding to each of a touch panel and a desk top, a driver 211 including a printer driver, and various files and functions as a computer-readable storage medium. A network I/F 213 is connected to the printer 102 via the network 103 and performs communication control processing between the printer 102.

Figure 3:
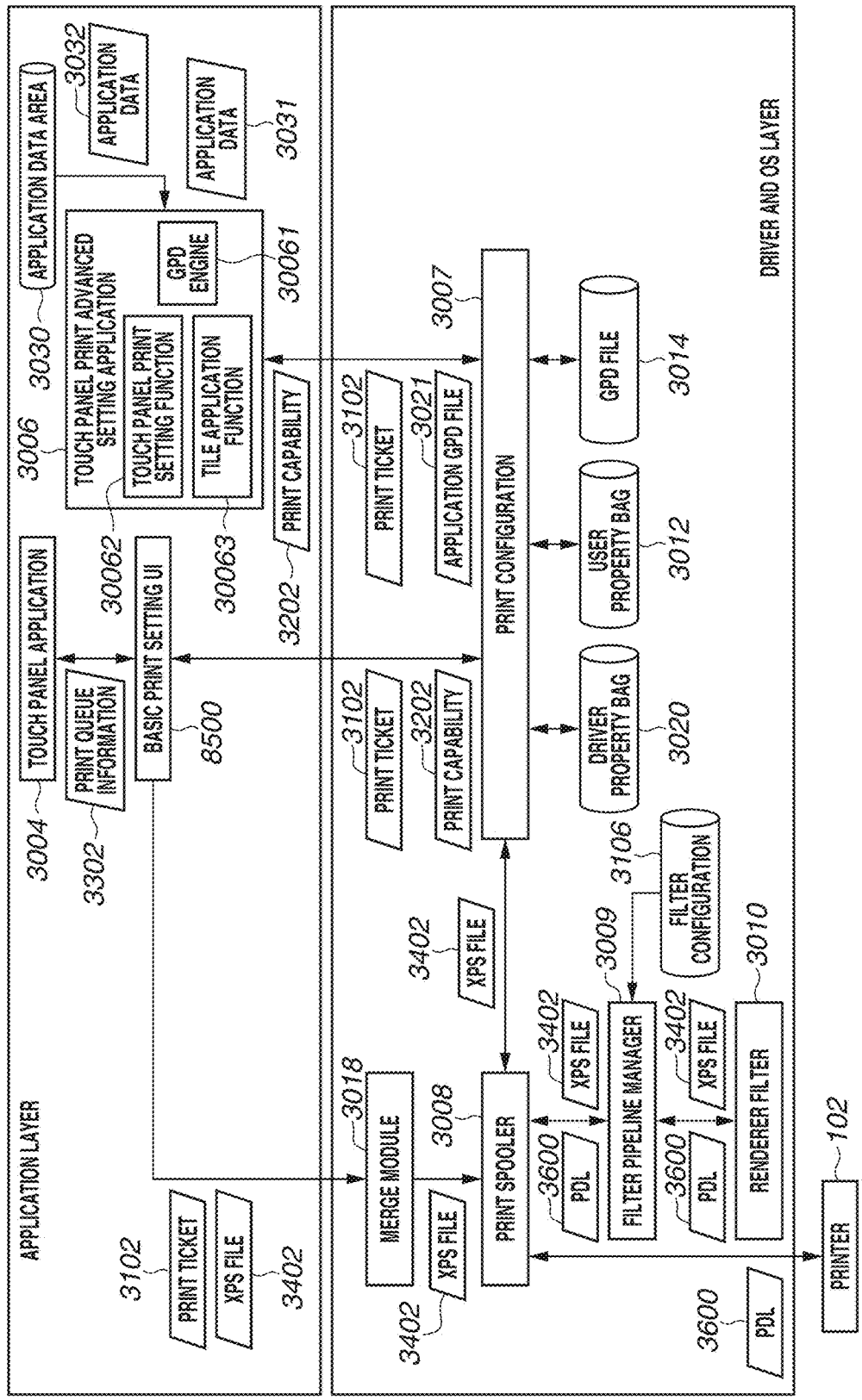
FIG. 3 illustrates a configuration of an application and a driver.

FIG. 3 is a configuration diagram of an application and a driver operating on the OS 210. FIG. 3 is divided into an application layer at which a user can directly perform an operation and a driver and OS layer controlled by the OS 210 according to a request from the application. Each application and module are stored in the external memory 209, loaded to the RAM 202 when needed, and executed by the CPU 201 on the client computer 101. Processing regarding printing executed by the OS 210 is divided into a print instruction performed on the touch panel and print processing in the driver and OS layer. First, a software component regarding the print instruction performed on the touch panel is described.

Each touch panel application 3004 includes a basic print setting UI 8500 as a basic UI for printing, obtains print queue information 3302 from the OS 210 in response to a user request, and displays the basic print setting UI 8500 associated with the print queue information 3302. The print queue information 3302 is information of each printer driver including a name of an installed printer driver. The basic print setting UI 8500 is a simple print setting UI generated and displayed by the OS 210 based on a print capability 3202 and a print ticket 3102. The print ticket 3102 is information of the print setting which has been set. The print capability 3202 is information of a list of print settings that the driver 211 can set. The print ticket 3102 and the print capability 3202 are described in a form referred to as an Extensible Markup Language (XML) in which information is divided into items by tags and managed. When the print ticket 3102 is generated by the OS 210, the print ticket 3102 is in a state without conflict.

A touch panel print advanced setting application 3006 is started from the basic print setting UI 8500 in response to the user request. The touch panel print advanced setting application 3006 is an application for a print advanced setting which is directed to performing display of a list of functions of various drivers 211 and a change in the advanced print setting from the touch panel application 3004. When the touch panel print advanced setting application 3006 is called and started on the occasion of print execution by another application, the touch panel print advanced setting application 3006 operates as a touch panel print setting function 30062. On the other hand, when the touch panel print advanced setting application 3006 is started by a user selecting a tile on a start screen, the touch panel print advanced setting application 3006 operates as a tile application function 30063. The tile application function 30063 and the touch panel print setting function 30062 share application data in an application data area 3030 in a data storage area of the touch panel print advanced setting application 3006. The touch panel print advanced setting application 3006 includes a GPD engine 30061 which is a first module for performing conflict resolving processing. The GPD engine 30061 is an internal module of the touch panel print advanced setting application 3006.

In addition, the touch panel print advanced setting application 3006 can input and output unique data to and from a user property bag 3012 and a registry 3016. The user property bag 3012 is a storage area for the touch panel print setting function 30062 of the touch panel print advanced setting application 3006 and stores user setting information and the like in the print setting. When operating as the touch panel print setting function 30062, the touch panel print advanced setting application 3006 requests the print ticket 3102 and the print capability 3202 from the OS 210. The touch panel print advanced setting application 3006 obtains an application GPD file 3021 from a driver property bag 3020. A GPD file is a script file describing a conflict rule which includes a priority order for determining a setting to be prioritized and the like when a conflict occurs. The application GPD file 3021 is a GPD file used by the touch panel application 3004 to resolve a conflict. Configurations of the print capability 3202, the print ticket 3102, and the application GPD file 3021 are described below. The driver property bag 3020 is a data area for each driver 211. According to the present exemplary embodiment, the application GPD file 3021 is stored in the driver property bag 3020. The touch panel print advanced setting application 3006 generates a UI based on the print capability 3202 and the print ticket 3102 and receives a user operation. After completion of receiving, the touch panel print advanced setting application 3006 determines the print setting and passes the print ticket 3102 as the determined print setting to the OS 210.

The OS 210 performs the processing for resolving the conflict on the print ticket 3102 by a print configuration 3007 and passes the print ticket 3102 in which the conflict is resolved to the basic print setting UI 8500. The print configuration 3007 is a module of the OS 210 and resolves the conflict based on a GPD file 3014. The basic print setting UI 8500 receives a print event by a user operation and passes the print ticket 3102 and an Extensible Markup Language (XML) paper specification (XPS) file 3402 as a print target to a merge module 3018. An XPS file is a document file described in the XML format.

Next, a software component regarding print processing in the driver and OS layer is described. In the print processing, processing from when the XPS file 3402 and the print ticket 3102 are received from the touch panel application 3004 to when a PDL 3600 is generated and passed to the printer 102 is performed. The merge module 3018 received the print ticket 3102 and the XPS file 3402 from the touch panel application 3004 combines the print ticket 3102 with the XPS file 3402 and generates the XPS file 3402 as the print target. The merge module 3018 adds the print ticket 3102 as the print setting to the XPS file 3402 and thus combines them. The merge module 3018 passes the XPS file 3402 to a print spooler 3008. The print spooler 3008 passes the XPS file 3402 to the print configuration 3007 to resolve the conflict. The print spooler 3008 obtains the XPS file 3402 on which the processing for resolving the conflict is performed from the print configuration 3007. The print spooler 3008 passes the XPS file 3402 to a filter pipeline manager 3009. The filter pipeline manager 3009 is a module for calling a module referred to as a filter and generates the PDL 3600 from the XPS file 3402 through the filter. In a filter configuration 3106, a configuration of a filter to be called by the filter pipeline manager 3009 is described in the XML format, and a necessary filter is called in response to the description. According to the present exemplary embodiment, a renderer filter 3010 is called as an example. The print spooler 3008 obtains the PDL 3600 from the filter pipeline and passes the PDL 3600 to the printer 102, and thus printing is performed.

The application GPD file 3021 in the driver property bag 3020 is described with reference to FIGS. 13A to 13C. The application GPD file 3021 is constituted of data pieces of options of selection items such as the conflict rule and a paper size and others. An item 1700 is an example in which the conflict rule is expressed. The conflict rule is expressed by describing a combination in which two print settings are invalid. In FIGS. 13A to 13C, a combination of "postcard" of the paper size and "long side and double-sided" of double-sided printing is invalid, and each is expressed as PaperSize.PostCard, and DUPLEX.VERTICAL. In an item 1701, the print setting of the selection item of the paper size is described, and similarly, in an item 1702, the print setting of the double-sided printing is described. An item 1703 is an option of a setting item, and FIG. 13B is an example which describes detailed data of "postcard" of the paper size. An item 1704 is priority of the paper size and indicates that a setting item having a lower value is prioritized when a conflict is resolved. For example, in FIG. 13B, the priority of the paper size is 1, and in FIG. 13C, an item 1705 indicates that the priority of the double-sided printing is 15. Thus, when the conflict described in the item 1700 is resolved, "postcard" of the paper size is not changed, and the setting of the double-sided printing is changed.

Next, the print capability 3202 and the print ticket 3102 are described with reference to FIGS. 12A and 12B. FIG. 12A is an example of the print capability 3202. The print capability 3202 is a list of functions and items that the printer driver has and described in the XML format. The list of functions is described by a tag referred to as "Feature". In FIG. 12A, an item 12001 indicates PageMediaSize which represents the paper size as an example. The list of items of each function is described by a tag referred to as "Option". According to the present exemplary embodiment, an item 12002 indicates "Letter" which is one of the paper size as an example of Option. The print capability 3202 respectively includes one or a plurality of Feature and Option. FIG. 12B is an example of the print ticket 3102. The print ticket 3102 is a list of selection items of the print setting and described in the XML format. The functions and items are described by tags of Feature and Option as with the print capability 3202. According to the present exemplary embodiment, an item 12003 indicating DocumentDuplex representing double-sided printing as the selection item is indicated as an example of Feature, and an item 12004 indicating OneSided representing single-sided printing as the option is described as an example of Option.

FIGS. 4A to 4F illustrates examples of the touch panel UI operating on the OS 210. A basic flow of printing from the touch panel UI is described with reference to FIGS. 4A to 4F. The UI of the touch panel application 3004 is designed by focusing on an operation on a touch panel display. The UI includes a large button so that a touch operation with a finger or a pen is easy. The touch panel application 3004 receives an operation input by a mouse or a keyboard, however, the following description is made on the assumption that a touch operation is performed.

Figure 4A:
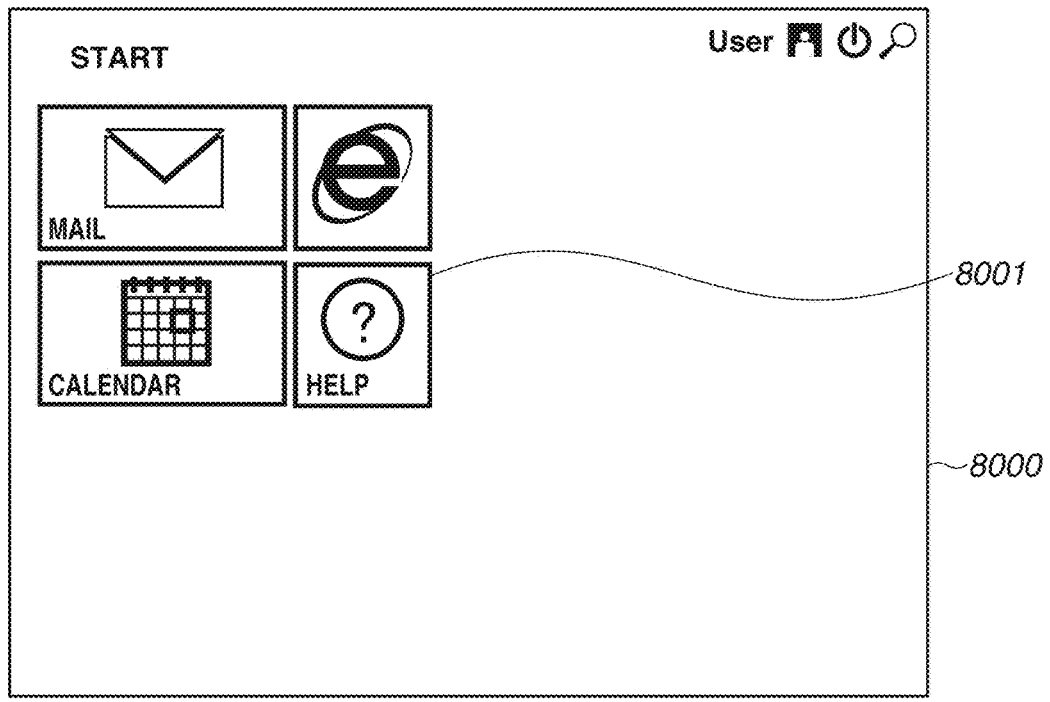
FIGS. 4A to 4F illustrate screen transition of a touch panel application.
Figure 4B:
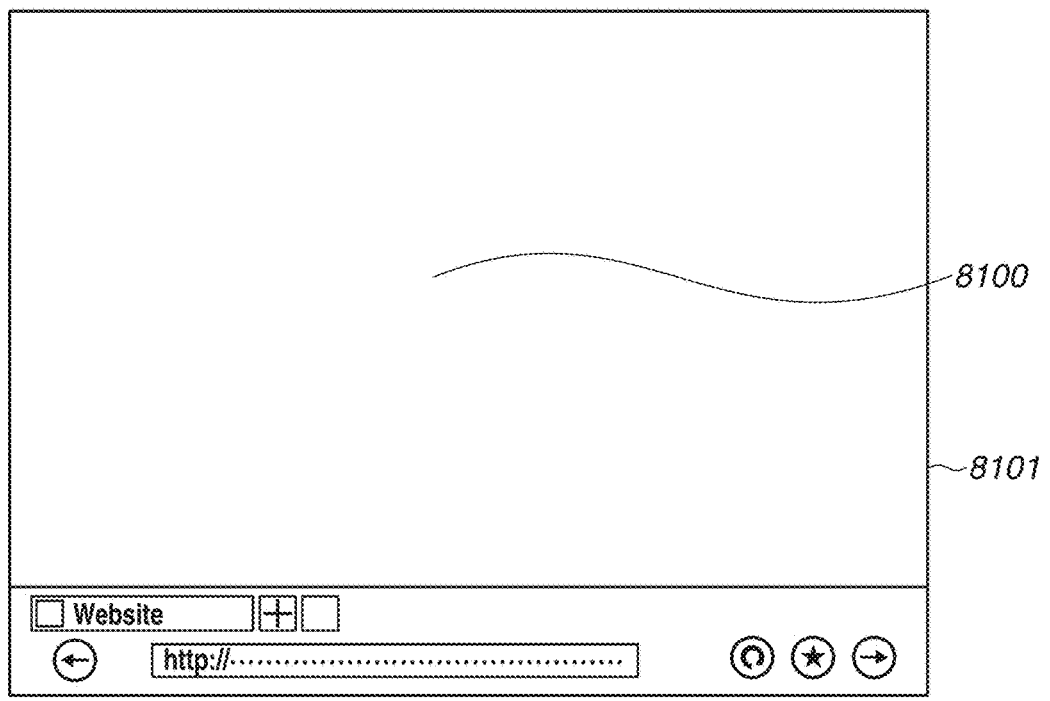
Figure 4C:
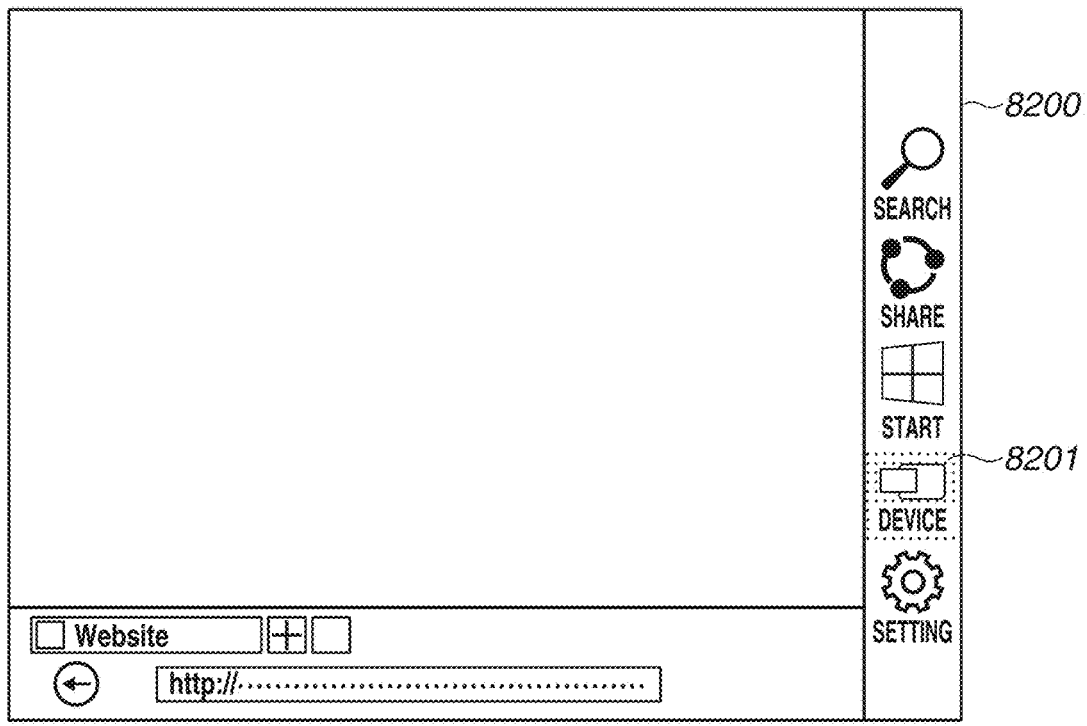
Figure 4D:
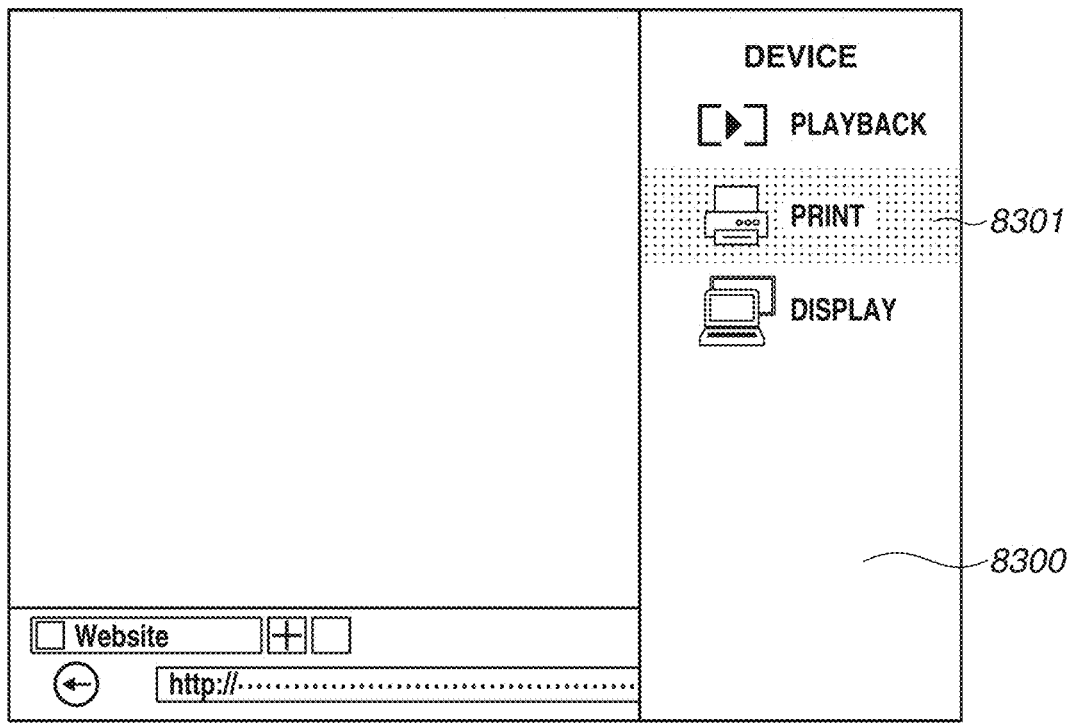
Figure 4E:
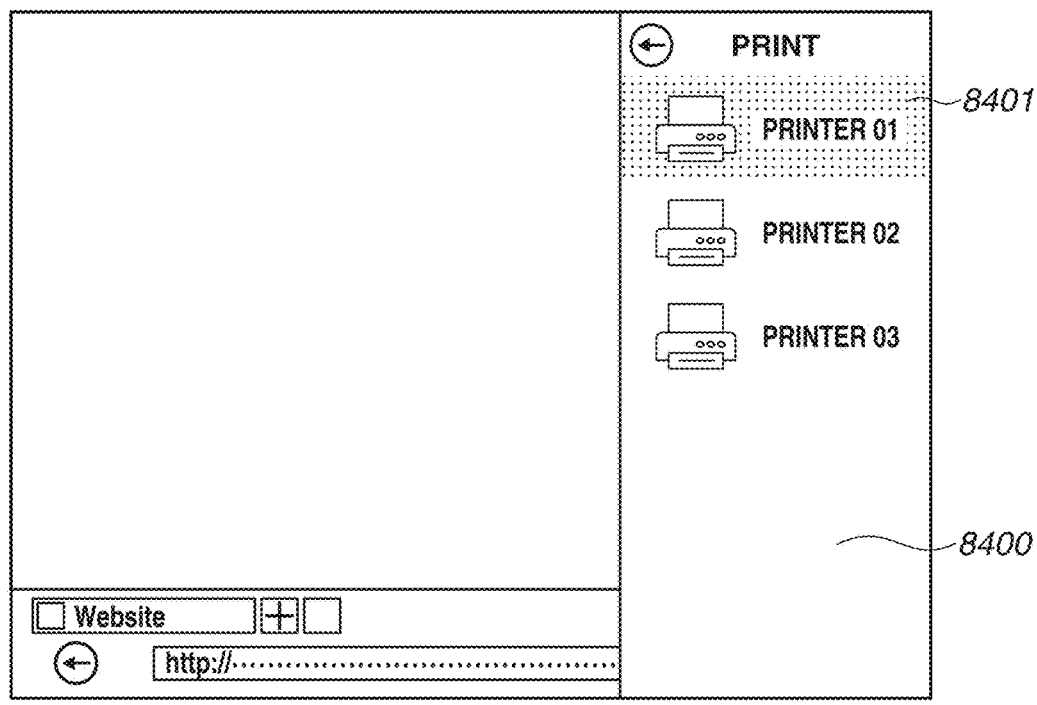
Figure 4F:
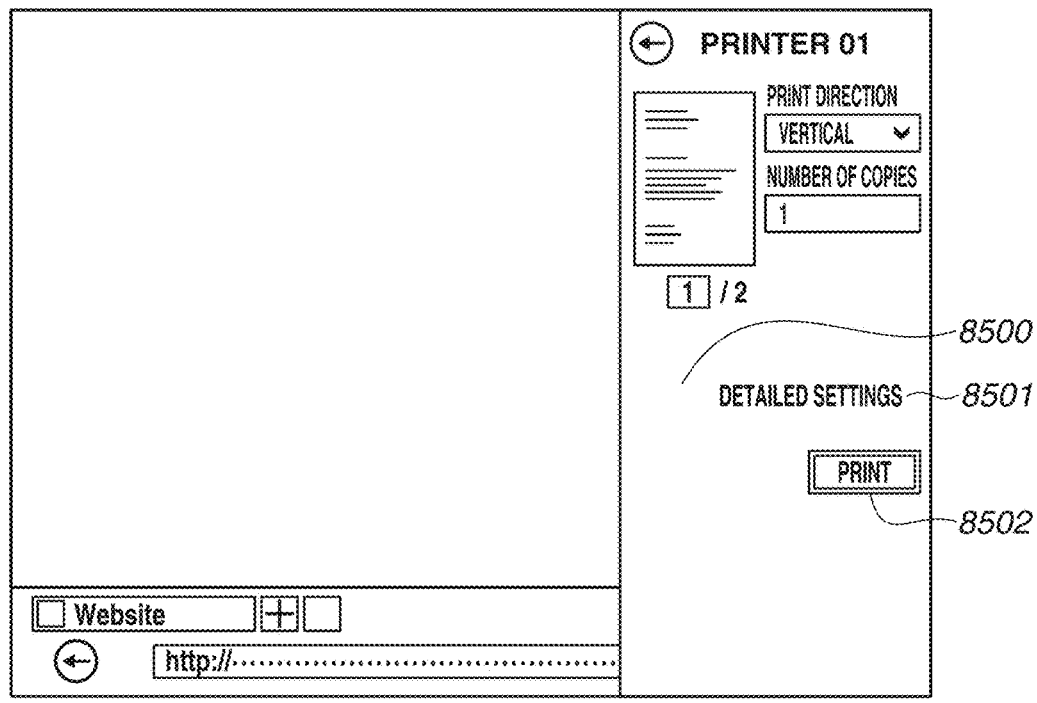

FIG. 4A illustrates a start screen 8000 of the touch panel application 3004. The start screen 8000 is displayed on a whole area on the touch panel display. In the start screen, the touch panel application 3004 is displayed in a format of a tile 8001. When a user taps the tile, the touch panel application corresponding to the tile is displayed on the whole area on the display. FIG. 4B illustrates a display example of a WEB browser 8100. The WEB browser 8100 is displayed on the whole area of the touch panel display, and another application is not displayed. When printing is performed by the touch panel application 3004, a user starts the operation by touching a right end 8101 on the touch panel display with his/her finger and sliding the finger to the left to open a menu screen referred to as a charm 8200 in FIG. 4C. The charm includes a plurality of options, and when the user taps a device in the options and further taps a device menu button 8201 in a list related to the device, the user can open a device menu 8300. FIG. 4D illustrates the device menu 8300. The device menu 8300 includes a plurality of options such as playback, print, and display. When the user taps the print 8301, a print queue selection menu 8400 in FIG. 4E for selecting a print queue of a print output destination is displayed. In the print queue selection menu 8400, candidates of the print output destination are listed. When the user taps "PRINTER 01" 8401 which is one of the candidates, the basic print setting UI 8500 in FIG. 4F provided by the OS 210 is displayed. Basic print setting information such as the number of copies and a color mode can be set via the basic print setting UI 8500. When the user presses a detailed setting 8501, the touch panel print advanced setting application 3006 is started, and thus the user can perform a detailed setting which is not included in the basic setting. The detailed setting is described in detail below. When the user completes the settings and taps a print button 8502, the PDL 3600 is generated, and printing is performed.

Figure 5A:
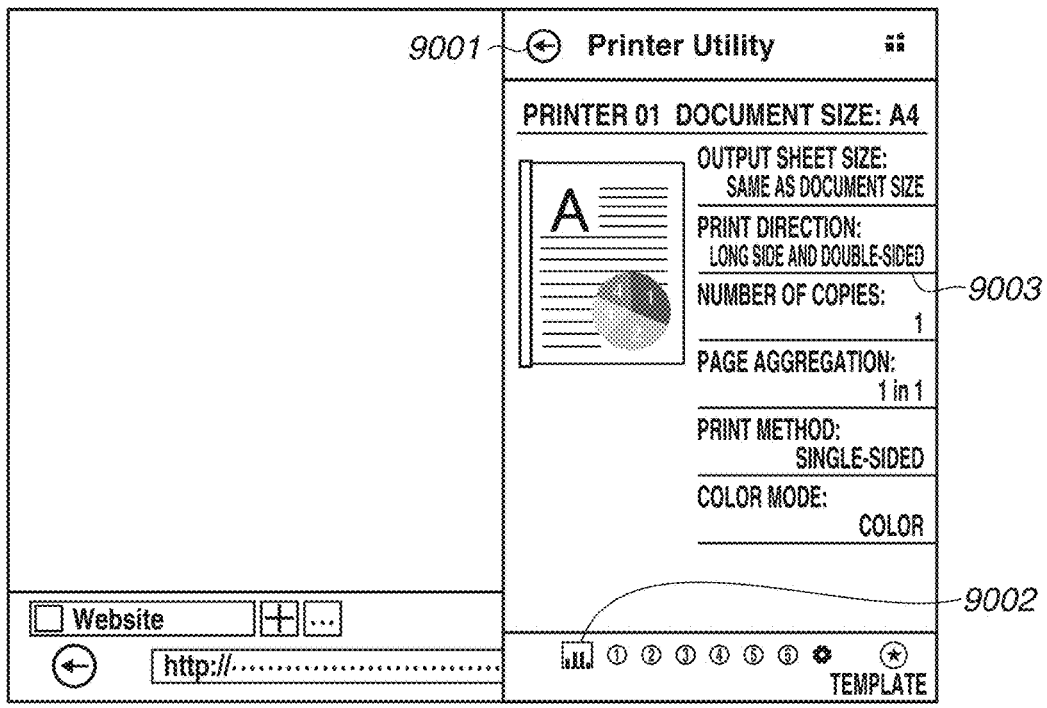
FIGS. 5A and 5B illustrate screens of a touch panel print advanced setting application.
Figure 5B:
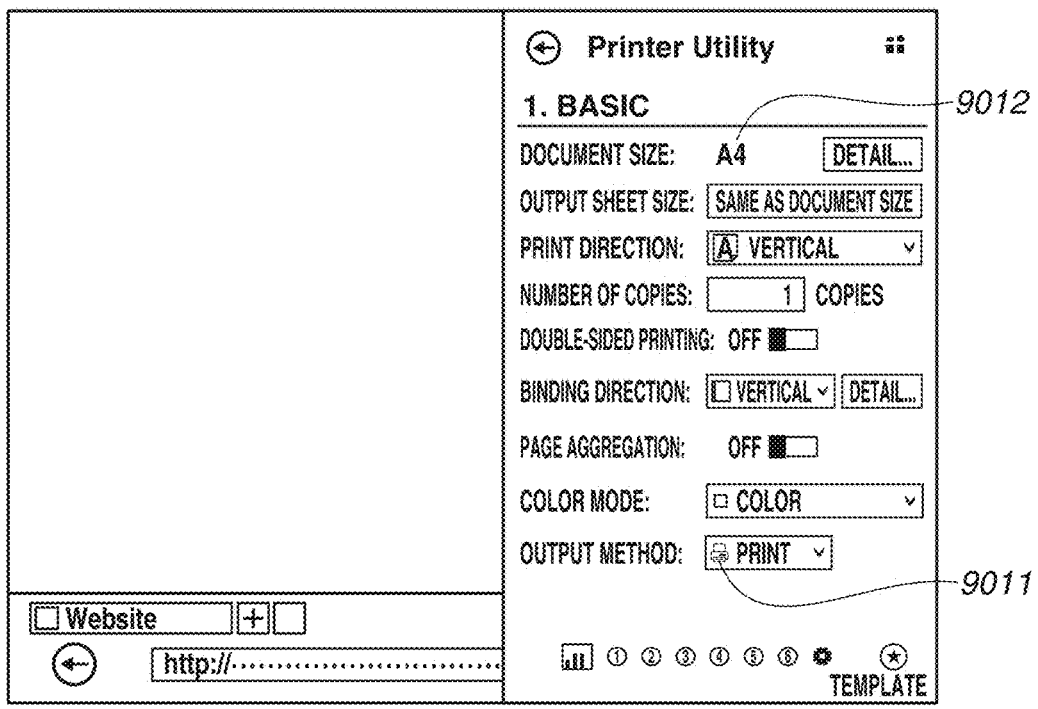

FIGS. 5A and 5B illustrate the touch panel print advanced setting application 3006. The touch panel print advanced setting application 3006 according to the exemplary embodiment of the present invention includes a top page screen in FIG. 5A and a full function setting screen in FIG. 5B which includes an output method and the like. Unless otherwise noted, the two setting screens receive a change in the print setting from a user. In the top page screen, setting items regarding basic functions of the driver are assembled, and in the full function setting screen, further detailed setting functions are assembled. These two print setting screens can be moved by sliding a finger on the touch panel. The full function setting screen is constituted of a plurality of sheets by control referred to as flip view. In flip view, a user can shift a page to an adjacent page by sliding his/her finger to right and left.

In addition, the touch panel print advanced setting application 3006 includes a page dot 9002 displayed on a lower area. The page dots 9002 are displayed for the number of pages with respective page numbers. When tapping the page dot 9002, a user can shift to a sheet corresponding to the page number by one operation. Needless to say, transition of the page may be performed by another method such as a tab. In the example in FIG. 5A, a setting item 9003 for setting a print direction is indicated. A return button 9001 is tapped when a user determines the print setting and terminates the touch panel print advanced setting application 3006. In FIG. 5B, an output method 9011 which is an item in which an option such as a secure print can be set is indicated as an example. In FIG. 5B, "print" indicating normal printing is set. Further, an item 9012 is used for setting a document size.

Figure 14:
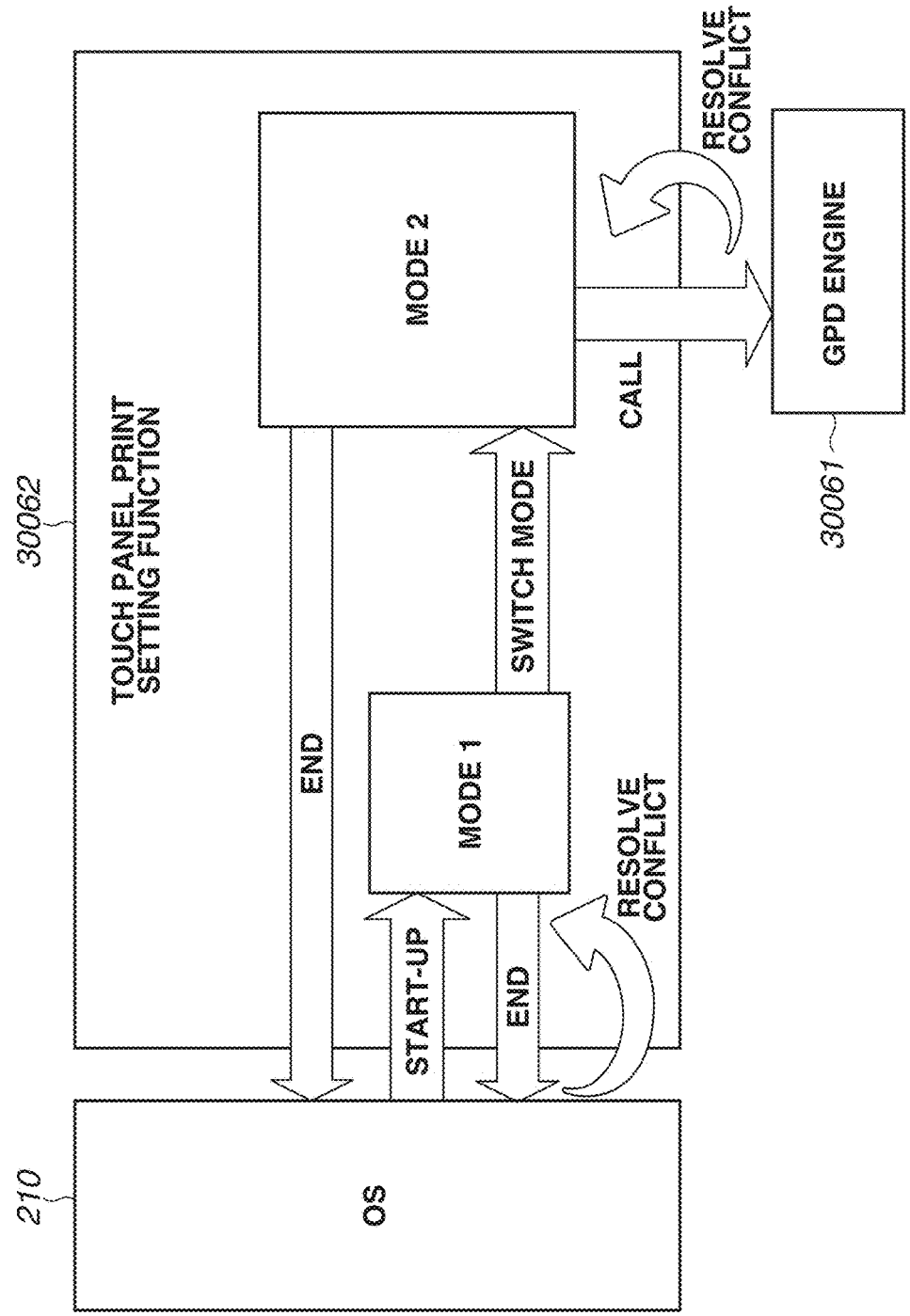
FIG. 14 is a configuration diagram of a touch panel print setting function.

A configuration of the touch panel print setting function 30062 is described with reference to FIG. 14. The touch panel print setting function 30062 includes two modes of a mode 1 and a mode 2. The mode 1 is a mode first started when the touch panel print advanced setting application 3006 is started by the touch panel print setting function 30062. The mode 1 is directed to high-speed start-up of the touch panel print setting function 30062, and the touch panel print setting function 30062 can be start without waiting completion of the initialization of the GPD engine 30061. In addition, when the initialization of the GPD engine 30061 is completed, the mode can be changed to the mode 2 at a predetermined timing. Further, the print setting can be determined in the mode 1. In the mode 1, when a conflict is resolved, the processing for resolving the conflict is performed by calling an application programming interface (API) of the OS 210 instead of not calling the GPD engine 30061. On the other hand, the mode 2 is a mode which can be started when the initialization of the GPD engine 30061 is completed, and the processing for resolving the conflict is performed using the GPD engine 30061. The mode is basically changed only from the mode 1 to the mode 2 and is not changed from the mode 2 to the mode 1.

Figure 16A:
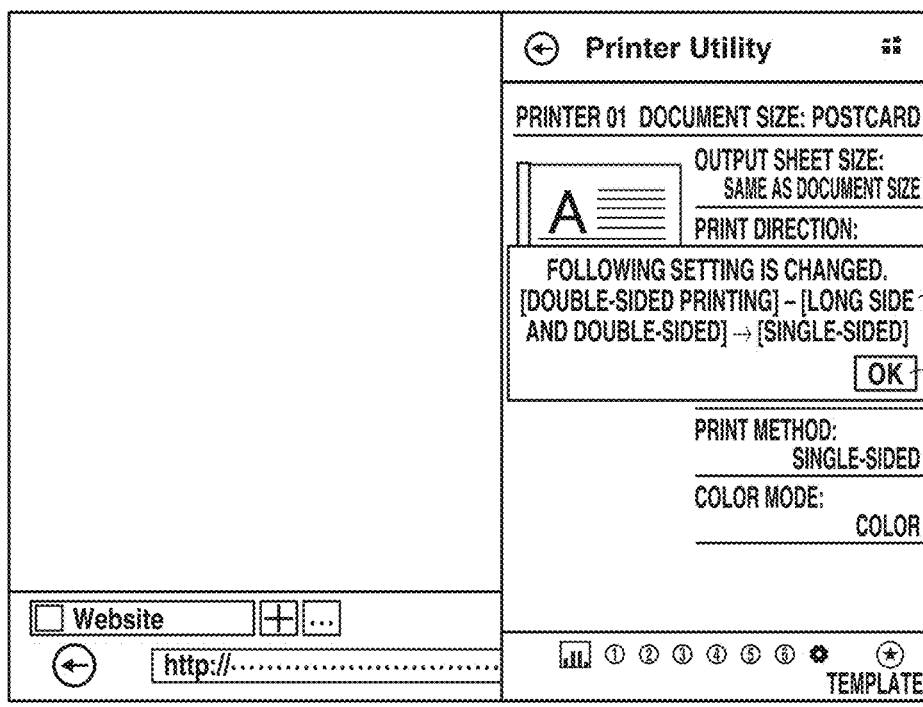
FIGS. 16A to 16C illustrate notification of conflict processing.
Figure 16B:
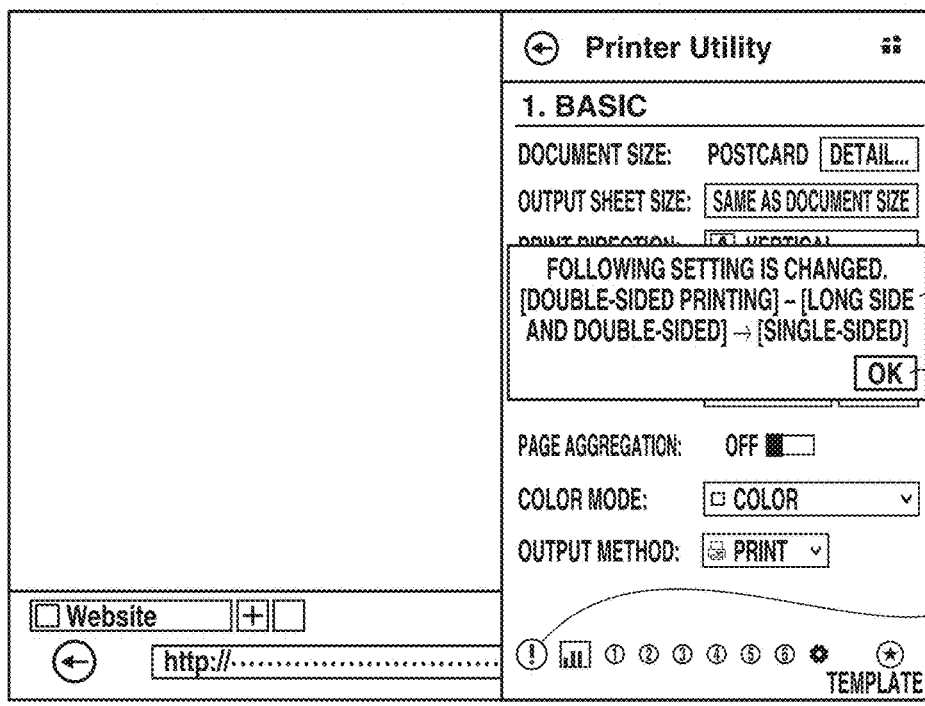
Figure 16C:
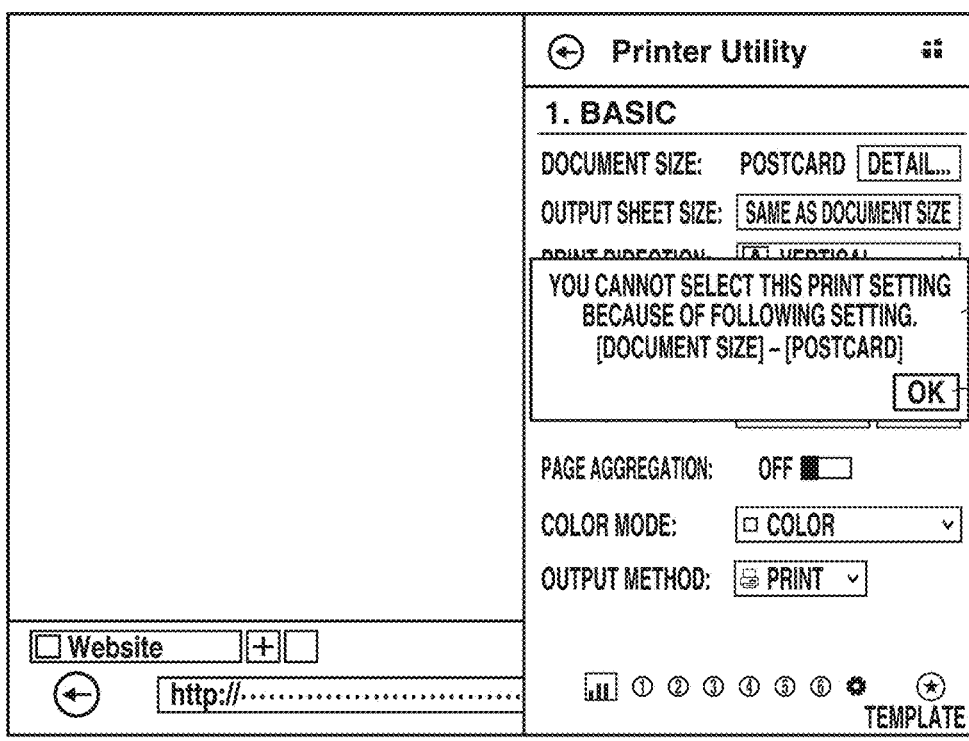

A conflict notification method is described with reference to FIGS. 16A to 16C. The conflict notification method can be divided into a case in which a conflict is resolved by the API of the OS 210 (processing for resolving conflict by the OS) and a case in which a conflict is resolved by the GPD engine 30061 when a user performs an operation. A notification by the processing for resolving conflict by the OS is performed in step S6013 in FIG. 6A which is described below, and notification in the case that the conflict is resolved by the GPD engine 30061 when a user performs an operation is performed in step S6053 in FIG. 6C which is described below. Further, when a conflict in the print setting changed by a user is resolved, the latter case can be divided into two cases, that is a case when the print setting item changed by the user is set prior to the print setting item of the conflict target (a prior conflict notification) and a case when the print setting item changed by the user is not prioritized (an inferior conflict notification). Thus, there are three notification methods in total.

First, a case when a conflict is resolved by the API of the OS 210 is described. An OS conflict notification pop-up 16001 in FIG. 16A is used for notifying a user of a conflict when the processing for resolving conflict by the OS is performed. Only the print setting changed when the conflict is resolved is notified to the user. The print setting to be notified is notified in any print setting on other pages including a top page and the full function setting screen. When a plurality of print settings is changed, all changed settings are displayed in the OS conflict notification pop-up 16001. The OS conflict notification pop-up 16001 can be deleted by tapping an area of the touch panel print advanced setting application 3006 outside of the OS conflict notification pop-up 16001 or tapping an OK button 16002 in the screen. FIG. 16A is an example when "long side and double-sided" in the print setting is changed to "single-sided printing" by the print setting item changed by a user.

The prior conflict notification is described with reference to FIG. 16B. In the case of the prior conflict notification, a lower portion conflict mark 16003 is displayed. When a user taps the lower portion conflict mark 16003, a prior conflict notification pop-up 16004 is displayed. In the prior conflict notification pop-up 16004, the print setting is displayed which is changed when the conflict is resolved. The print setting to be displayed is displayed in the prior conflict notification pop-up 16004 even in the print setting in pages which are not displayed including the top page and the full function setting screen. When a plurality of print settings is changed, the plurality of print settings is displayed in the prior conflict notification pop-up 16004. During a period when the lower portion conflict mark 16003 is displayed, the touch panel print advanced setting application 3006 receives a change in the print setting and transition to another screen. The lower portion conflict mark 16003 is not deleted until the print setting is changed again or the touch panel print advanced setting application 3006 is terminated. The prior conflict notification pop-up 16004 can be deleted by tapping the area of the touch panel print advanced setting application 3006 outside of the prior conflict notification pop-up 16004 or tapping an OK button 16005 in the screen. FIG. 16B is an example when "long side and double-sided" in the print setting is changed to "single-sided printing" by the print setting item changed by a user.

The inferior conflict notification is described with reference to FIG. 16C. An inferior conflict notification pop-up 16006 is illustrated. The inferior conflict notification pop-up 16006 is displayed when a conflict occurs and a print setting intended by a user cannot be set. Displayed contents are the print setting which causes the conflict with the print setting that the user intended to set. When a plurality of print settings causes the conflict, the plurality of print settings is displayed. The inferior conflict notification pop-up 16006 can be deleted by tapping the area of the touch panel print advanced setting application 3006 outside of the inferior conflict notification pop-up 16006 or tapping an OK button 16007 in the screen. The inferior conflict notification pop-up 16006 in FIG. 16C is a display example which indicates that when a user tried to set "long side and double-sided" to the print setting in the state in which "postcard" is set in the document size, "postcard" is prioritized and the change to "long side and double-sided" is failed.

A flow from start-up of the touch panel print advanced setting application 3006 to determination of the print setting is described with reference to flowcharts in FIGS. 6A to 6D. Unless otherwise specified, processing in the present flowchart is executed by the touch panel print advanced setting application 3006. In addition, the touch panel print advanced setting application 3006 operates as the touch panel print setting function 30062. The touch panel print advanced setting application 3006 is loaded from the external memory 209 to the RAM 202 in response to a request from a user or another system and executed by the CPU 201.

In steps S6002 and S6003, the touch panel print advanced setting application 3006 reads the print capability 3202 and the print ticket 3102 and, in step S6005, displays the top page screen illustrated in FIG. 5A in the mode 1 in which the processing for resolving a conflict using the API of the OS 210 is performed on all of the setting items when the print settings are determined. In the mode 1 of the present exemplary embodiment, the conflict is resolved not every time the print setting is changed but by batch when the return button 9001 in FIG. 5A is pressed. The processing for resolving conflict by the OS may be called every time the print setting is changed instead of when the return button 9001 is pressed.

The page dot 9002 is not displayed on the top page screen in the mode 1 so as not to allow a user to perform an operation to shift the screen to the full function setting screen. As a measure for notifying a user that the page dot 9002 is not available, another method may be used, for example, a progress ring is rotated.

In step S6006, initialization of the GPD engine 30061 is performed in a background after displaying the top page screen. The GPD engine 30061 is a module which performs processing for notifying a conflict and for resolving the conflict based on the application GPD file 3021. FIG. 6B illustrates steps of the initialization of the GPD engine 30061. The touch panel print advanced setting application 3006 generates a background thread separately from a UI thread for receiving a user input and performs the processing in FIG. 6B in the generated background thread. In step S6032, the touch panel print advanced setting application 3006 first reads the application GPD file 3021 and performs parsing which is processing for analyzing a grammatical relationship in the description of the conflict rule. After parsing, in step S6033, the touch panel print advanced setting application 3006 initializes the GPD engine 30061 and, in step S6034, terminates the thread after completion of the initialization.

The description is continued by returning to FIG. 6A. After the processing in step S6006 is completed, in step S6007, the touch panel print advanced setting application 3006 receives a user input in a foreground during the initialization of the GPD engine 30061.

After receiving the user input, in step S6501, the touch panel print advanced setting application 3006 determines the input. When the setting item including the print direction 9003 is changed in the mode 1 ("PRINT SETTING IS CHANGED" in step S6501), in step S6008, the change in the setting item is reflected to the print ticket 3102. When the return button 9001 is pressed in the mode 1 ("RETURN BUTTON 9001 IS PRESSED" in step S6501), in step S6011, the setting item is reflected to the current print ticket 3102, and the processing for resolving conflict by the OS is called using the print ticket 3102 as an input value. This processing is realized by the touch panel print advanced setting application 3006 calling the processing for resolving the conflict by the second module. The second module is an external module of the touch panel print advanced setting application 3006, and the touch panel print advanced setting application 3006 does not need to initialize the second module. However, when the print setting is not changed, it is not necessary to call the processing for resolving the conflict. The processing for resolving conflict by the OS is executed by the print configuration 3007 based on the GPD file 3014. The print configuration 3007 obtains the print ticket 3102 (a print ticket at the time of the input) from the touch panel print advanced setting application 3006 and generates the print ticket 3102 (a print ticket at the time of the output) in which the conflict is resolved when the conflict exists. When the print ticket 3102 in which the conflict occurs is input, the processing for resolving conflict by the OS outputs the print ticket 3102 in which the conflict is resolved based in the GPD file 3014.

In step S6012, the touch panel print advanced setting application 3006 determines whether the conflict exists based on the two print tickets namely the print ticket at the time of the input and the print ticket at the time of the output. When the print ticket in which the conflict is resolved is output, the touch panel print advanced setting application 3006 determines that the conflict exists (YES in step S6011) and, in step S6013, notifies that the conflict exists by the notification method illustrated in FIG. 16A. At that time, the touch panel print advanced setting application 3006 compares the print ticket at the time of the input and the print ticket at the time of the output and displays a list of items changed by the processing for resolving the conflict in the OS conflict notification pop-up 16001. In step S6014, the print ticket at the time of the output is reflected to the UI, however, the screen is not shifted to the basic print setting UI 8500. In step S6012, when it is determined that the conflict does not exist (NO in step S6012), the processing proceeds to step S6022.

In step S6501, in response to a determination that a user slides his/her finger on the touch panel, in other words, an instruction to shift a print setting screen is received from the user ("SLIDE FROM RIGHT TO LEFT" in step S6501), the processing proceeds to step S6010. In step S6010, the touch panel print advanced setting application 3006 receives the slide event and determines whether reading processing of the application GPD file 3021 and the initialization processing of the GPD engine 30061 performed in the background thread are completed. If the processing are not completed (NO in step S6010), the slide event is ignored, whereas if the processing are completed (YES in step S6010), in step S6015, the full function setting screen illustrated in FIG. 5B is displayed, and the mode is changed from the mode 1 to the mode 2. According to the present exemplary embodiment, in the mode 2, the touch panel print advanced setting application 3006 notifies a user of a conflict every time the setting item is changed. Needless to say, an event for changing to the mode 2 is not limited to the slide event and may include other events such as a touch and a click. Further, in the mode 2, the page dot 9002 is displayed on all pages. After the mode is changed to the mode 2, in step S6016, the processing for resolving the conflict is performed.

The processing in step S6016 is described with reference to FIG. 6C. In step S6051, the touch panel print advanced setting application 3006 confirms that a conflict exists. After the confirmation, in step S6052, the touch panel print advanced setting application 3006 determines whether the conflict exists. If the conflict exists (YES in step S6052), in step S6053, the touch panel print advanced setting application 3006 displays a pop-up to notify a user of a content of the conflict. In step S6053, the touch panel print advanced setting application 3006 determines which of the prior conflict notification or the inferior conflict notification to use to make notification according to the conflict rule. The notification method is not limited to those in FIGS. 16B and 16C and may be any other method. After the notification, in step S6054, the touch panel print advanced setting application 3006 compares items of the function causing the conflict and resolves the conflict by changing the setting having the lower priority order based on the application GPD file 3021.

After the conflict is resolved, the setting item is reflected to the UI, and in step S6017, the user input is received again.

When the user input is received in the mode 2, in step S6018, the user input is determined. The top page screen illustrated in FIG. 5A can be displayed in response to occurrence of the slide event by the user ("SLIDE FROM LEFT TO RIGHT" in step S6018), in step S6019, the operating mode is not changed from the mode 2 to the mode 1. Of course, the page dot 9002 is also continuously displayed. Since the operating mode is not changed to the mode 1, after changing to the mode 2, the conflict can be notified in the top page screen every time the setting item is changed. When the setting item of the function including "print" of the output method 9011 is changed in the mode 2 ("PRINT SETTING IS CHANGED" in step S6018), in step S6020, the touch panel print advanced setting application 3006 performs the processing for resolving the conflict based on the application GPD file 3021. Since step S6020 is similar to step S6016, a description thereof is omitted.

When the conflict does not occur, in step S6021, the change in the setting item is reflected to the UI, and the user input is received again. When the return button 9001 is input ("RETURN BUTTON 9001 IS PRESSED" in step S6018), in step S6022, the touch panel print advanced setting application 3006 reflects the setting item to the print ticket 3102 to generate the print ticket 3102 and then stores the generated print ticket 3102. In step S6023, the OS 210 resolves the conflict in the print ticket 3102. Unlike the processing in step S6011, resolving of the conflict in step S6023 is processing automatically performed by the OS 210, and when the conflict is resolved, notification is not made. After resolving the conflict, in step S6024, the touch panel print advanced setting application 3006 shifts the screen to the basic print setting UI 8500 and terminates the processing. According to the above-described exemplary embodiment, a user can change the print setting without waiting for an initialization time of the GPD engine 30061.

Figure 7B:
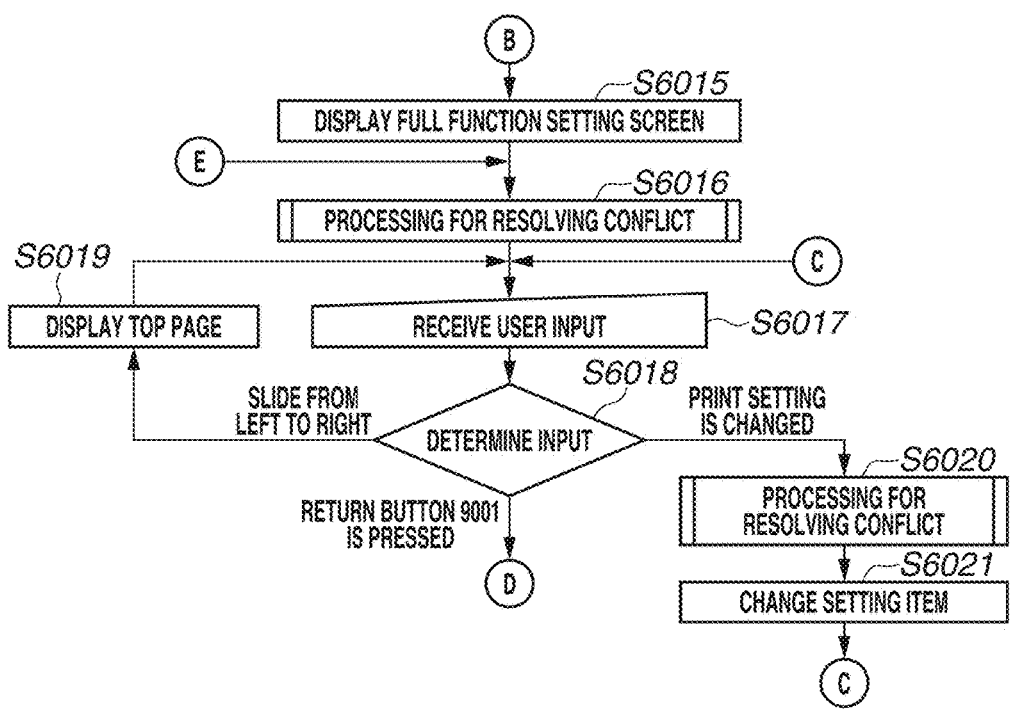

According to the first exemplary embodiment, the mode cannot be changed to the mode 2 until the screen is shifted to the full function setting screen. According to a second exemplary embodiment, a method for changing to the mode 2 when the start-up of the GPD engine 30061 is completed in the mode 1 is described with reference to flowcharts in FIGS. 7A and 7B. Unless otherwise specified, processing in the present flowchart is executed by the touch panel print advanced setting application 3006. In addition, the touch panel print advanced setting application 3006 operates as the touch panel print setting function 30062. Further, a step of which processing is the same as that in the step already described is denoted with the same step number as the step already described, and the description thereof is omitted unless otherwise noted. The touch panel print advanced setting application 3006 is loaded from the external memory 209 to the RAM 202 in response to a request from a user or another system and executed by the CPU 201.

In step S6501, when it is determined that the setting item is changed ("PRINT SETTING IS CHANGED" in step S6501), in step S7008, the touch panel print advanced setting application 3006 determines whether the initialization of the GPD engine 30061 is completed. When the initialization of the GPD engine 30061 is not completed (NO in step S7008), in step S7010, the touch panel print advanced setting application 3006 reflects the change in the setting item to the UI. When the initialization of the GPD engine 30061 is completed (YES in step S7008), in step S6016 in FIG. 7B, the touch panel print advanced setting application 3006 changes the mode to the mode 2 and performs the processing for resolving the conflict based on the application GPD file 3021. The processing for resolving the conflict is same as that in FIG. 6C, and thus the description thereof is omitted.

In step S6501, when it is determined that the user slides his/her finger on the touch panel ("SLIDE FROM RIGHT TO LEFT" in step S6501), in step S6010, the touch panel print advanced setting application 3006 receives the slide event and determines whether the reading processing of the application GPD file 3021 and the initialization processing of the GPD engine 30061 performed in the background thread are completed.

According to the present exemplary embodiment, when the setting item is changed, it is confirmed that whether the initialization of the GPD engine 30061 is completed, and the mode can be changed to the mode 2 when the initialization of the GPD engine 30061 is completed.

According to the first exemplary embodiment, display of the page dot 9002 and transition to the full function setting screen cannot be performed until the initialization of the GPD engine 30061 is completed. According to a third exemplary embodiment, transition of a page and display of the page number by the page dot 9002 can be performed before the initialization of the GPD engine 30061 is completed. The present exemplary embodiment is described with reference to flowcharts in FIGS. 8A and 8B. Unless otherwise specified, processing in the present flowchart is executed by the touch panel print advanced setting application 3006. In addition, the touch panel print advanced setting application 3006 operates as the touch panel print setting function 30062. Further, a step of which processing is the same as that in the step already described is denoted with the same step number as the step already described, and the description thereof is omitted unless otherwise noted. The touch panel print advanced setting application 3006 is loaded from the external memory 209 to the RAM 202 in response to a request from a user or another system and executed by the CPU 201.

Figure 8A:
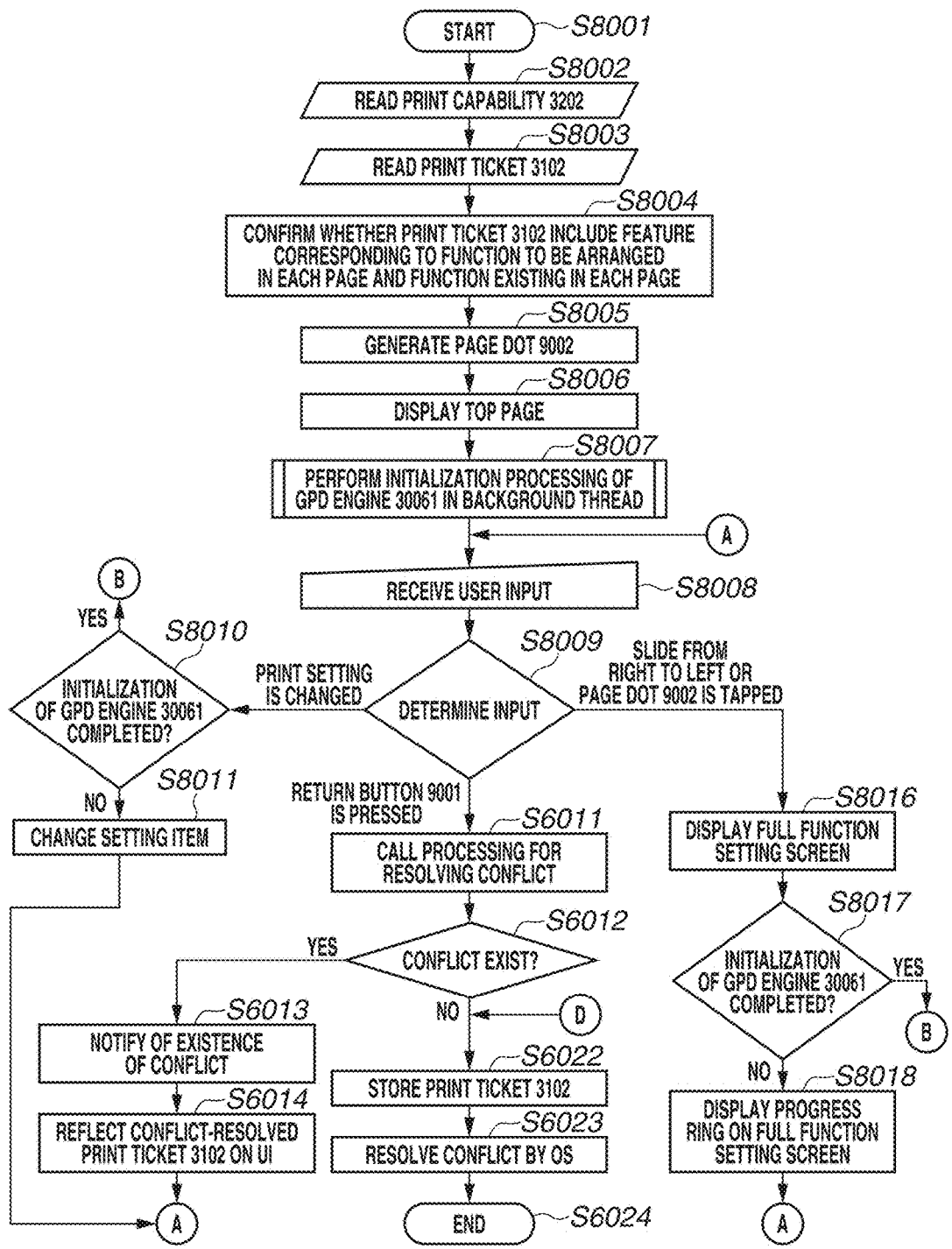
FIGS. 8A and 8B are flowcharts of a touch panel print advanced setting application according to a third exemplary embodiment.
Figure 8B:
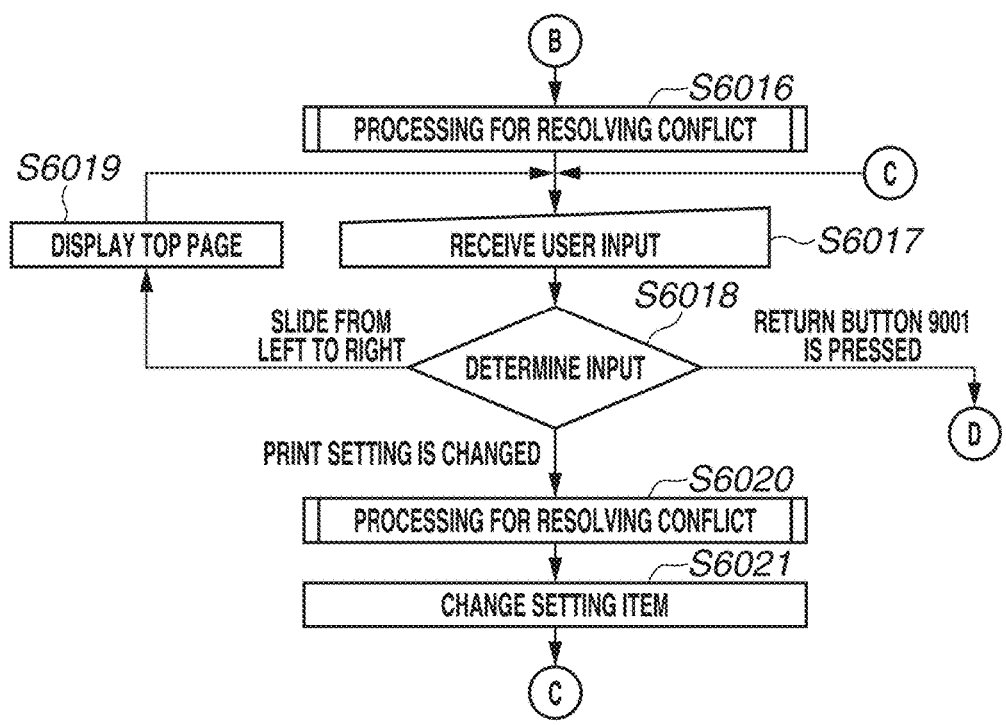

In steps S8002 and S8003 in FIG. 8A, the touch panel print advanced setting application 3006 reads the print capability 3202 and the print ticket 3102.

In step S8004, the touch panel print advanced setting application 3006 confirms whether the read print ticket 3102 includes Features corresponding to a function to be arranged in each page and a function existing in each page and, in step S8005, generates page information of a page to be generated and the page dot 9002 corresponding to the page. A case is described as an example in which the print capability 3202 includes PageMediaSize in the Feature. PageMediaSize is associated with a document size 9012 in FIG. 5B. When the print capability 3202 includes PageMediaSize in the Feature, it is necessary to display the document size 9012. Thus, when the print capability 3202 includes PageMediaSize in the Feature, the touch panel print advanced setting application 3006 determines to generate a page of the full function setting screen including the document size 9012 and generates the page information and the page dot 9002. The full function setting screen is constituted of a plurality of pages, so that the touch panel print advanced setting application 3006 confirms whether the Feature corresponding to the control is similarly included in each page and confirms the number of pages. When the number of pages is determined, it may be confirmed from information in either of the print ticket 3102 and the print capability 3202, and it is needless to say that any information described in the print ticket 3102 or the print capability 3202 including other Features and Options can be used for the determination. Further, the generated page information may be stored in the application data area 3030 and the user property bag 3012, and the stored page information may be used in start-up for the second time and subsequent times instead of using the print capability 3202 and the print ticket 3102.

After generating the page dot 9002 and each page, in step S8006, the touch panel print advanced setting application 3006 displays the top page screen in the mode 1.

When the top page screen is displayed in the mode 1, the page dot 9002 is also displayed. Next, in step S8007, the touch panel print advanced setting application 3006 initializes the GPD engine 30061 in the background thread. The initialization of the GPD engine 30061 in step S8007 is the same as that in FIG. 6B, and thus the description thereof is omitted.

During the initialization of the GPD engine 30061, in step S8008, the touch panel print advanced setting application 3006 receives the user input in the foreground. In step S8009, the touch panel print advanced setting application 3006 determines the input received in step S8008.

When the setting item including the print direction 9003 is changed in the mode 1 ("PRINT SETTING IS CHANGED" in step S8009), in step S8010, the touch panel print advanced setting application 3006 confirms whether the initialization of the GPD engine 30061 is completed. When the initialization is not completed (NO in step S8010), in step S8011, the touch panel print advanced setting application 3006 receives the change in the setting item and reflects the change to the UI. When the initialization is completed (YES in step S8010), in step S6016, the touch panel print advanced setting application 3006 changes the mode to the mode 2 and performs the processing for resolving the conflict based on the application GPD file 3021.

In step S8009, when it is determined that the return button 9001 is pressed as in the mode 1 ("RETURN BUTTON 9001 IS PRESSED" in step S8009), the processing proceeds to step S6011.

In step S8009, when it is determined that the user slides his/her finger on the touch panel as in the mode 1, or when the page dot 9002 is tapped ("RETURN BUTTON 9001 IS PRESSED OR PAGE DOT 9002 IS TAPPED" in step S8009), in step S8016, the touch panel print advanced setting application 3006 receives an event for shifting the screen to the full function setting screen and displays the full function setting screen.

After the transition, in step S8017, the touch panel print advanced setting application 3006 determines whether the reading processing of the application GPD file 3021 and the initialization processing of the GPD engine 30061 performed in the background thread are completed.

When the processing are not completed (NO in step S8017), in step S8018, a progress ring is displayed on the full function setting screen. The progress ring is displayed until the initialization processing of the GPD engine 30061 is completed, and a change in the print setting is not received on the full function setting screen while the progress ring is displayed. In addition, the full function setting screen after the transition does not receive changes in all of the setting items in the print setting and receives only the user input of page transition and a tap on the return button 9001. During the processing, the mode remains in the mode 1.

When the initialization of the GPD engine 30061 is completed (YES in step S8017), in step S6016, the touch panel print advanced setting application 3006 changes the mode to the mode 2 and performs the processing for resolving the conflict. In addition, available functions are all displayed on the full function setting screen.

According to the above-described exemplary embodiment, the print advanced setting application can perform display of the page dot 9002 and transition to the full function setting screen in the mode 1.

Figure 9B:
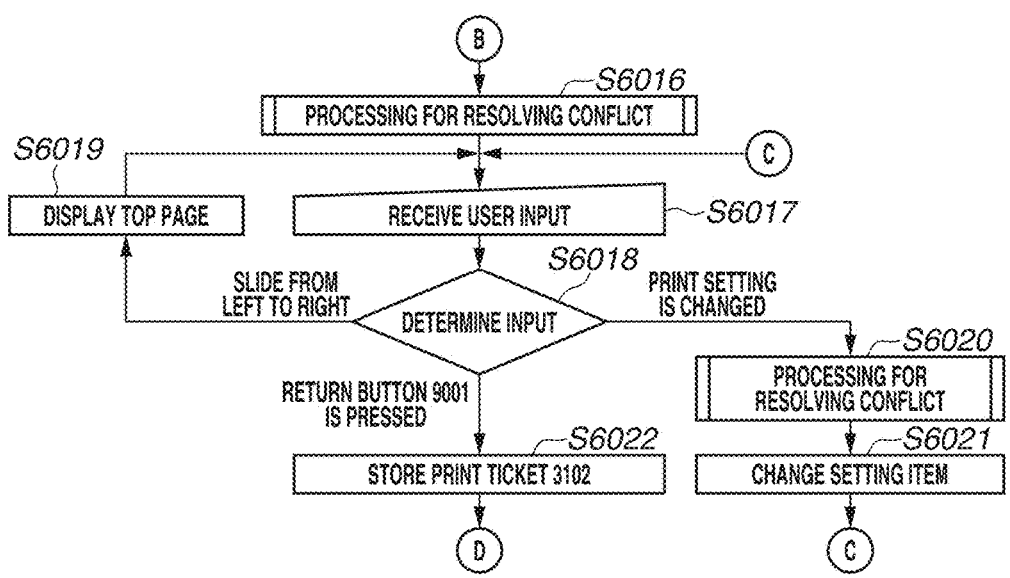

According to the first exemplary embodiment, the print setting can be changed regardless of completion of the initialization of the GPD engine 30061 the mode 1, however, in that case, it is necessary to perform the processing for resolving conflict by the OS, and there is an issue that the setting is performed without knowing whether the conflict exists until the print setting is determined. In this case, if many conflicts have been set, there is a possibility that the setting may be completely different from the print setting set by the user, and the user has to reset many of the setting items again. According to a fourth exemplary embodiment, the start-up is performed in the mode 1 for confirming only a list of functions and items, and when the setting item is changed in the mode 1, the setting item is determined after shifting to the mode 2. A method for preventing the print settings causing the conflicts being concurrently displayed while increasing the speed of start-up time by the above-described processing is described with reference to FIGS. 9A and 9B. Unless otherwise specified, processing in the present flowchart is executed by the touch panel print advanced setting application 3006. In addition, the touch panel print advanced setting application 3006 operates as the touch panel print setting function 30062. Further, a step of which processing is the same as that in the step already described is denoted with the same step number as the step already described, and the description thereof is omitted unless otherwise noted. The touch panel print advanced setting application 3006 is loaded from the external memory 209 to the RAM 202 in response to a request from a user or another system and executed by the CPU 201.

In step S8008, the touch panel print advanced setting application 3006 receives a user input on the foreground during the initialization of the GPD engine 30061. In step S9011, the touch panel print advanced setting application 3006 determines the received user input. When a page transition event including a slide is received in the mode 1 ("SLIDE FROM RIGHT TO LEFT OR PAGE DOT 9002 IS TAPPED" in step S9011), in step S9010, the full function setting screen is displayed. When the setting item including the print direction 9003 is changed ("PRINT SETTING IS CHANGED" in step S9011), in step S9012, the touch panel print advanced setting application 3006 confirms whether the initialization of the GPD engine 30061 is completed. When the initialization is completed (YES in step S9012), in step S6016, the touch panel print advanced setting application 3006 changes the mode to the mode 2 and performs the processing for resolving the conflict. When the initialization of the GPD engine 30061 is not completed (NO in step S9012), in step S9013, the touch panel print advanced setting application 3006 displays the progress ring and waits for completion of the initialization of the GPD engine 30061 without receiving a further change in the print setting from the user.

A timing for displaying the progress ring may be when an event for displaying a list of items of functions occurs or when the selection item is selected and determined. When the return button 9001 is pressed in the mode 1 ("RETURN BUTTON 9001 IS PRESSED" in step S9011), the print ticket 3102 is not changed, so that the touch panel print advanced setting application 3006 terminates processing without doing anything.

According to the above-described exemplary embodiment, occurrence of the conflict can be certainly notified when the print setting is changed while the speed of start-up is increased.

A method for changing a mode at the start-up between the mode 1 and the mode 2 is described as a fifth exemplary embodiment with reference to FIGS. 10A to 10C and FIG. 11. The touch panel print advanced setting application 3006 is loaded from the external memory 209 to the RAM 202 in response to a request from a user or another system and executed by the CPU 201. First, the tile application function 30063 is described which is included in the touch panel print advanced setting application 3006 and started and operated when a user selects a tile. The start-up method for causing the touch panel print advanced setting application 3006 to operate as the tile application function 30063 is similar to that of the normal touch panel application 3004 described with reference to FIG. 4A. Further, a step of which processing is the same as that in the step already described is denoted with the same step number as the step already described, and the description thereof is omitted unless otherwise noted.

Figure 11:
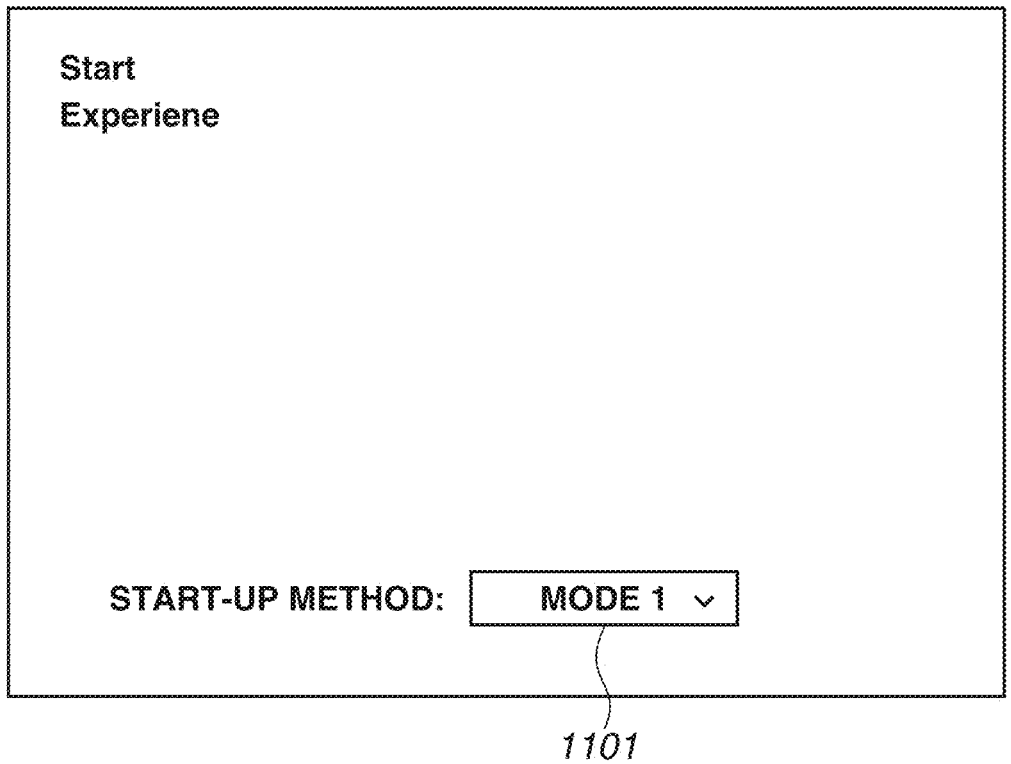
FIG. 11 is a schematic diagram of a touch panel application user interface (UI).

FIG. 11 illustrates a UI at the time of start-up as an example of the touch panel print advanced setting application 3006 operating as the tile application function 30063. When a combo box 1101 for switching the mode is tapped with a finger, a list of modes is displayed. When an arbitrary one in the displayed list is tapped again, a mode can be selected. Needless to say, the method for switching modes is not necessarily limited to the combo box and may be any method.

Figure 10A:
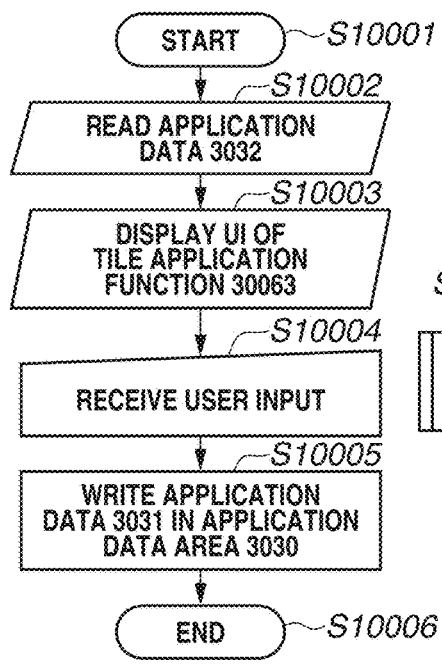
FIGS. 10A to 10C are flowcharts of a touch panel print advanced setting application according to a fifth exemplary embodiment.

Processing for switching the mode from the touch panel print advanced setting application 3006 operating as the tile application function 30063 is described with reference to FIG. 10A. Unless otherwise specified, processing in the present flowchart is executed by the touch panel print advanced setting application 3006. In addition, the touch panel print advanced setting application 3006 operates as the tile application function 30063. In step S10002, when starting up, the touch panel print advanced setting application 3006 reads application data 3032 in which the mode at the time of start-up is written from the application data area 3030. After reading the application data 3032, in step S10003, the touch panel print advanced setting application 3006 sets the mode written in the application data 3032 as a selected mode to a default value of an option in the combo box and displays the mode on the application. After displaying the mode, in step S10004, the touch panel print advanced setting application 3006 receives a user input. In step S10005, the touch panel print advanced setting application 3006 receives the user input, then rewrites the application data 3032, and writes rewritten application data 3031 to the application data area 3030. Subsequently, in step S10006, the touch panel print advanced setting application 3006 terminates the processing.

Figure 10B:
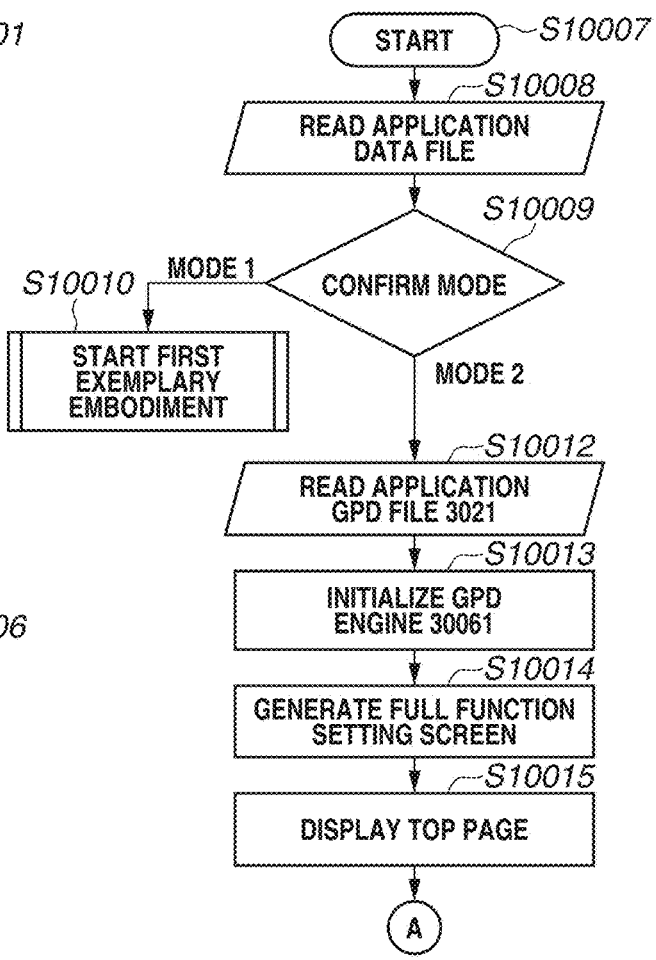
Figure 10C:
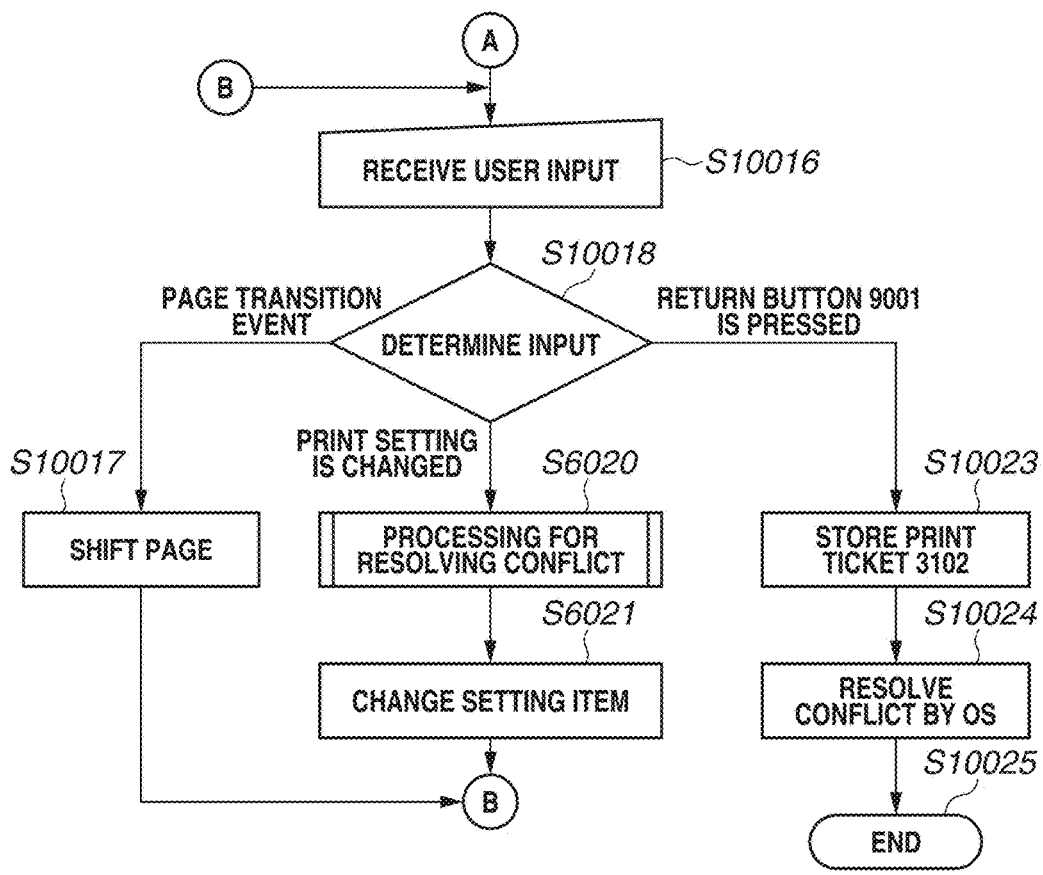

Next, the start-up of the touch panel print advanced setting application 3006 is described with reference to FIGS. 10B and 10C. Unless otherwise specified, processing in the present flowchart is executed by the touch panel print advanced setting application 3006. In addition, the touch panel print advanced setting application 3006 operates as the touch panel print setting function 30062.

In step S10008, the touch panel print advanced setting application 3006 reads the application data 3031 after the start-up. As described above with reference to FIG. 3, the tile application function 30063 shares data of the application data area 3030 with the touch panel print setting function 30062 which is the same application. Thus, in step S10008, the application data 3031 written in step S10005 of FIG. 10A is read. After the application data 3031 is read, in step S10009, the touch panel print advanced setting application 3006 determines the mode.

Figure 6A:
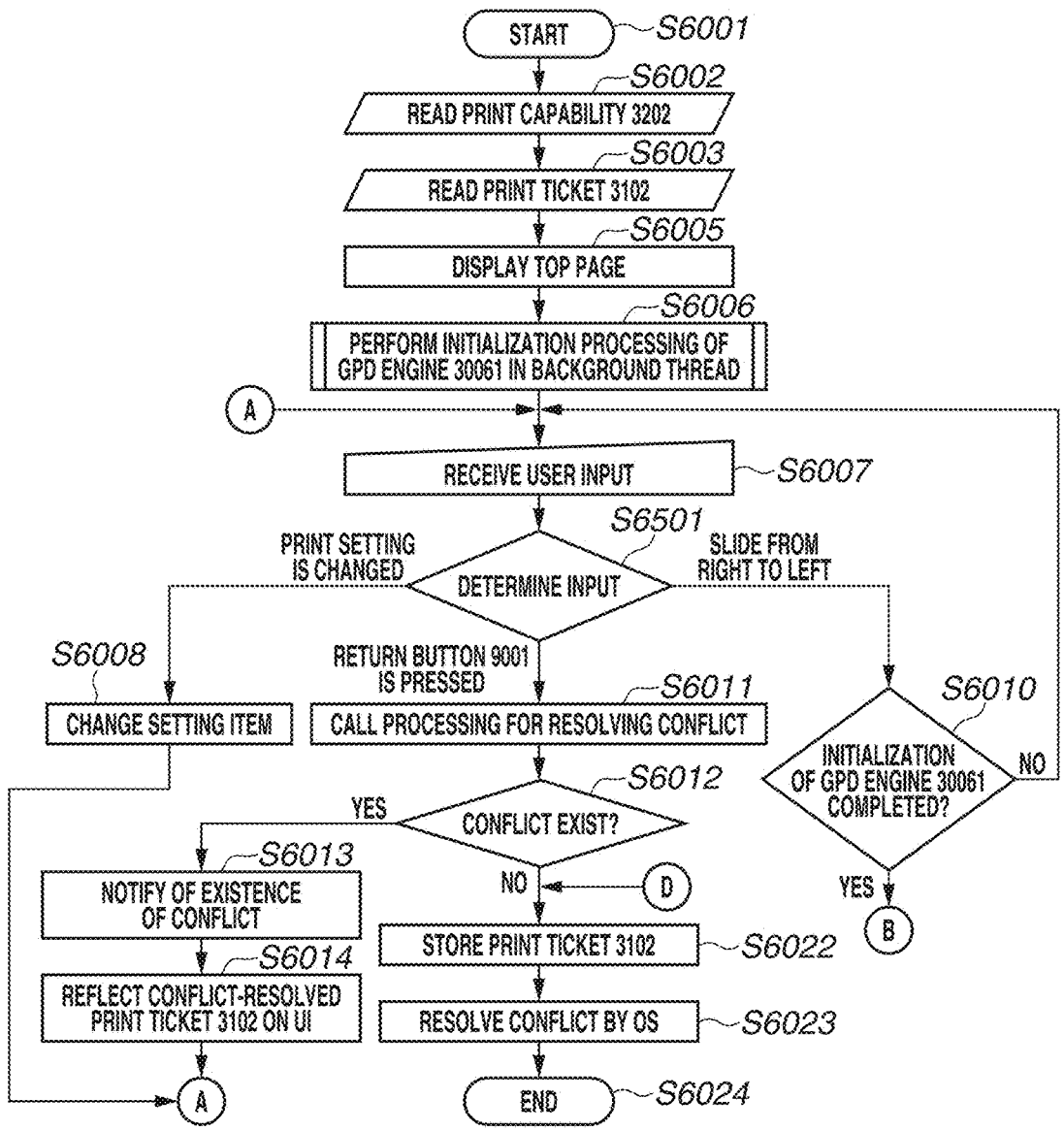
FIGS. 6A to 6D are flowcharts of the touch panel print advanced setting application.
Figure 6B:
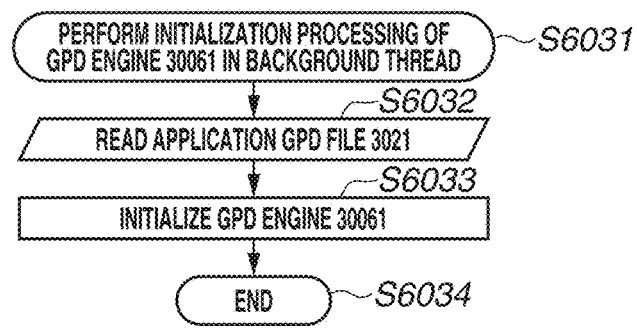
Figure 6C:
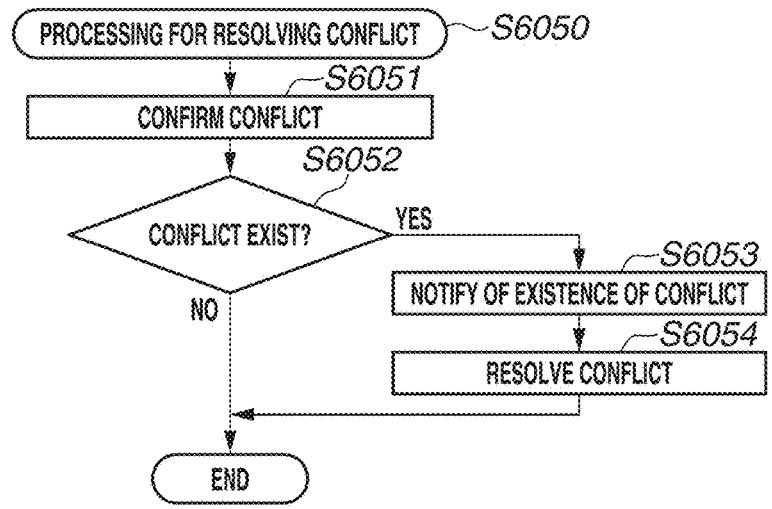
Figure 6D:
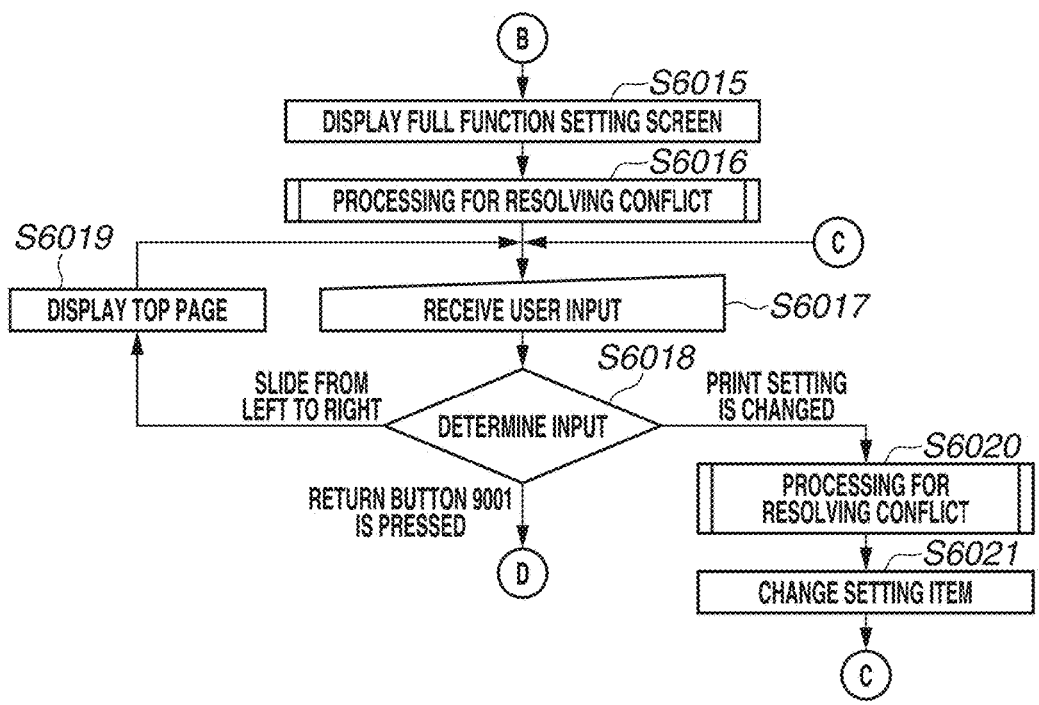

After reading, when the mode 1 is written in the application data 3031 ("MODE 1" in step S10009), in step S10010, the processing proceeds to step S6002 in FIG. 6A according to the first exemplary embodiment.

When the mode 2 is written ("MODE 2" in step S10009), in step S10012, which is a step at the time of start-up of the touch panel print advanced setting application, the touch panel print advanced setting application 3006 reads the application GPD file 3021 and performs parsing. After parsing, in step S10013, the touch panel print advanced setting application 3006 initializes the GPD engine 30061.

After completion of the initialization, in step S10014, the touch panel print advanced setting application 3006 generates the full function setting screen. Subsequently, in step S10015, the touch panel print advanced setting application 3006 displays the top page screen and, in step S10016, receives a user input. In step S10018, the touch panel print advanced setting application 3006 determines the received user input.

When a page transition event occurs by pressing the page dot 9002 and a slide operation ("PAGE TRANSITION EVENT" in step S10018), in step S10017, the touch panel print advanced setting application 3006 shifts the page and receives the user input again. When the setting item of the functions including "print" of the output method 9011 is changed ("PRINT SETTING IS CHANGED" in step S10018), in step S6020, the touch panel print advanced setting application 3006 performs the processing for resolving the conflict based on the application GPD file 3021.

When the return button 9001 is input ("RETURN BUTTON 9001 IS PRESSED" in step S10018), in step S10023, the touch panel print advanced setting application 3006 reflects the setting item to the print ticket 3102 and stores the print ticket 3102. Subsequently, in step S6023, the conflict in the print ticket 3102 is resolved by the OS 210. After the conflict is resolved, in step S10024, the touch panel print advanced setting application 3006 shifts the screen to the basic print setting UI 8500.

According to the present exemplary embodiment, start-up in the mode 1 and in the mode 2 can be switched, and the mode 1 can be used to start up quickly and the mode 2 can be used to certainly resolve the conflict.

Figure 15A:
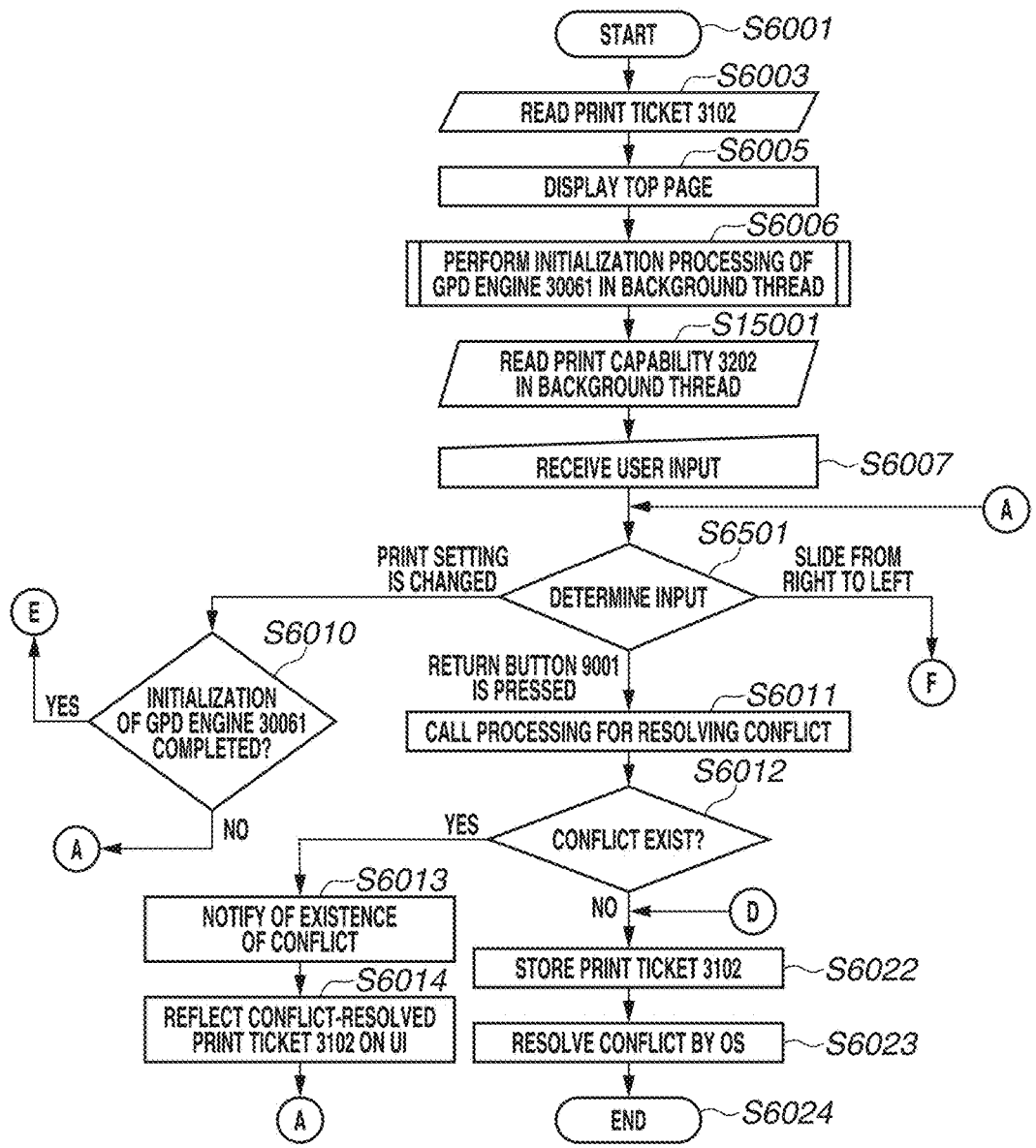
FIGS. 15A to 15C are flowcharts of a touch panel print advanced setting application according to a sixth exemplary embodiment.
Figure 15B:
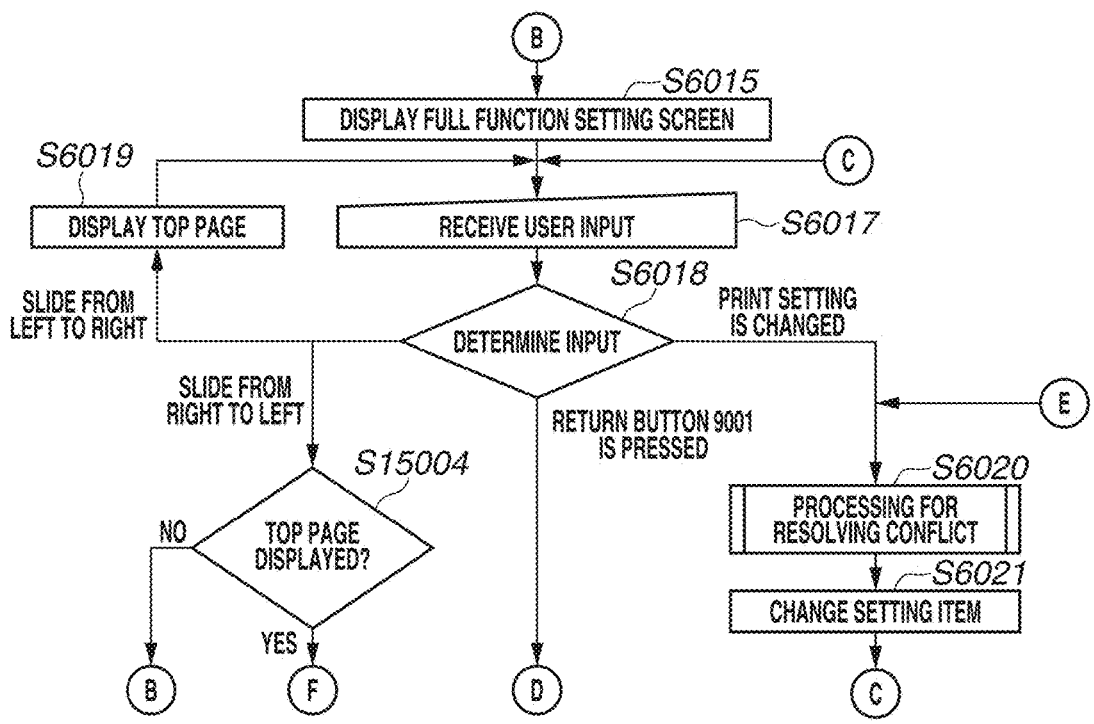
Figure 15C:
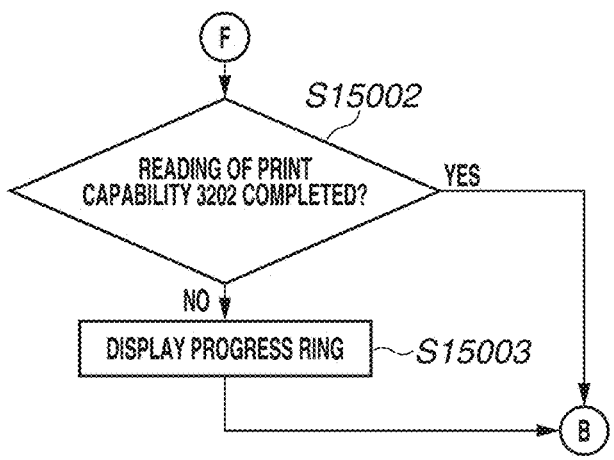

When the number of functions of the printer driver increases, the print capability 3202 becomes larger together with the application GPD file 3021. In such a case, processing for reading the print capability takes time which may slow the start-up. According to a sixth exemplary embodiment, a method for realizing high speed start-up by performing both of initialization processing of the GPD engine 30061 and reading processing of the print capability 3202 in the background thread different from the UI thread is described with reference to FIGS. 15A to 15C. Unless otherwise specified, processing in the present flowchart is executed by the touch panel print advanced setting application 3006. In addition, the touch panel print advanced setting application 3006 operates as the touch panel print setting function 30062. Further, a step of which processing is the same as that in the step already described is denoted with the same step number as the step already described, and the description thereof is omitted unless otherwise noted.

In step S15001, the touch panel print advanced setting application 3006 reads the print capability 3202 in the thread different from the UI thread. The processing in step S15001 is performed in the same thread as that of step S6006 and is started after completion of the initialization processing of the GPD engine 30061. Accordingly, the initialization of the GPD engine 30061 is certainly completed when reading of the print capability 3202 is completed. In step S6010, when the initialization of the GPD engine 30061 is completed (YES in step S6010), the touch panel print advanced setting application 3006 changes the mode from the mode 1 to the mode 2 even if reading of the print capability 3202 is not completed and advances the processing to step S6020.

In step S6501, when it is determined that a user slides his/her finger on the touch panel ("SLIDE FROM RIGHT TO LEFT" in step S6501), in step S15002, the touch panel print advanced setting application 3006 receives the slide event and confirms whether the reading processing of the print capability 3202 performed in the background thread is completed. When reading is completed (YES in step S15002), in step S6015, the touch panel print advanced setting application 3006 displays the full function setting screen. When reading of the print capability 3202 is not completed (NO in step S15002), in step S15003, the touch panel print advanced setting application 3006 displays the progress ring and waits for completion of reading. At the timing of the completion of reading, in step S6015, the touch panel print advanced setting application 3006 displays the full function setting screen.

In step S6018, when it is determined that the user slides his/her finger from right to left on the touch panel ("SLIDE FROM RIGHT TO LEFT" in step S6018), in step S15004, the touch panel print advanced setting application 3006 determines whether the top page is displayed. When the top page is displayed (YES in step S15004), the processing proceeds to step S15002. When the full function setting screen is displayed (NO in step S15004), the processing proceeds to step S6015.

According to the present exemplary embodiment, the speed of the start-up can be increased if reading of the print capability 3202 takes time. Further, the mode can be changed from the mode 1 to the mode 2 before completion of reading of the print capability 3202, and thus the processing for resolving the conflict and the processing for notifying of the conflict can be quickly performed every time the print setting is changed on the top page.

According to the present invention, a wait time of a user caused by two modules of the first module and the second module can be shortened.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-140046, filed Jul. 13, 2015, which is hereby incorporated by reference herein in its entirety.

What is claimed is:

1. An information processing apparatus comprising:
   one or more processors; and
   one or more memory devices storing executable instructions, which when executed by the one or more processors, cause the information processing apparatus to perform operations comprising:
      performing initialization of a first module which performs conflict resolving processing for resolving a conflict between two print settings, wherein the print settings include a print setting that is received on an application; and
      performing control, if the application receives a change in the print setting and initialization of the first module is completed, to perform the conflict resolving processing by the first module and, if an instruction to terminate the application is received and initialization of the first module is not completed, to call a function of conflict resolving processing by a second module that is an external module of the application, the function being the second module.

2. The information processing apparatus according to claim 1, the operations further comprising determining whether initialization of the first module is completed,
   wherein, if the application receives a change in the print setting and the determining determines that initialization of the first module is completed, the control performs the conflict resolving processing by the first module, and if an instruction to terminate the application is received and the determining determines that initialization of the first module is completed, the control calls the conflict resolving processing by the second module.

3. The information processing apparatus according to claim 2, wherein the determining determines whether initialization of the first module is completed in response to receiving an instruction from a user to shift from a first print setting screen to a second print setting screen.

4. The information processing apparatus according to claim 3, wherein, if the determining determines that initialization of the first module is not completed, the control unit performs control not to receive a change in a print setting on the second print setting screen.

5. The information processing apparatus according to claim 2, wherein the determining determines whether initialization of the first module is completed in response to receiving an instruction from a user to change a print setting.

6. The information processing apparatus according to claim 5, wherein, if the determining determines that initialization of the first module is not completed, the control unit waits until initialization of the first module is completed without receiving a further change in a print setting from a user.

7. The information processing apparatus according to claim 2, the operations further comprising:
   setting whether to perform initialization of the first module in a background or in a timing when an application is started up,
   wherein, if the setting sets to perform initialization of the first module in the background, the determining determines whether initialization of the first module is completed, and
   if the setting sets to perform initialization of the first module when the application is started up, the control performs initialization of the first module when the application is started up.

8. A method of control comprising:
   performing initialization of a first module which performs conflict resolving processing for resolving a conflict between two print settings, wherein the print settings include a print setting that is received on an application; and
   performing control, if the application receives a change in the print setting and initialization of the first module is completed, to perform the conflict resolving processing by the first module and, if an instruction to terminate the application is received and initialization of the first module is not completed, to call a function of conflict resolving processing by a second module that is an external module of the application, the function being the second module.

9. The method according to claim 8, further comprising determining whether initialization of the first module is completed,
wherein, if the application receives a change in the print setting and the determining determines that initialization of the first module is completed, the control performs the conflict resolving processing by the first module, and if an instruction to terminate the application is received and the determining determines that initialization of the first module is completed, the control calls the conflict resolving processing by the second module.

10. The method according to claim 9, wherein the determining determines whether initialization of the first module is completed in response to receiving an instruction from a user to shift from a first print setting screen to a second print setting screen.

11. The method according to claim 10, wherein, if the determining determines that initialization of the first module is not completed, the control performs control not to receive a change in a print setting on the second print setting screen.

12. The method according to claim 9, wherein the determining determines whether initialization of the first module is completed in response to receiving an instruction from a user to change a print setting.

13. The method according to claim 12, wherein, if the determining determines that initialization of the first module is not completed, the control waits until initialization of the first module is completed without receiving a further change in a print setting from a user.

14. The method according to claim 9, further comprising:
setting whether to perform initialization of the first module in a background or in a timing when an application is started up,
wherein, if the setting sets to perform initialization of the first module in the background, the determining determines whether initialization of the first module is completed, and
if the setting sets to perform initialization of the first module when the application is started up, the control performs initialization of the first module when the application is started up.

15. A non-transitory storage medium storing instructions to cause a computer to execute:
performing initialization of a first module which performs conflict resolving processing for resolving a conflict between two print settings, wherein the print settings include a print setting that is received on an application; and
performing control, if the application receives a change in the print setting and initialization of the first module is completed, to perform the conflict resolving processing by the first module and, if an instruction to terminate the application is received and initialization of the first module is not completed, to call a function of conflict resolving processing by a second module that is an external module of the application, the function being the second module.

* * * * *